United States Patent
Digiambattista et al.

(10) Patent No.: US 11,121,872 B2
(45) Date of Patent: Sep. 14, 2021

(54) TRUSTED VERIFICATION OF CYBERSECURITY REMEDIATION

(71) Applicant: ZERONORTH, INC., Boston, MA (US)

(72) Inventors: Ernesto Digiambattista, Lynnfield, MA (US); Andrei Bezdedeanu, Westwood, MA (US); Michael D. Kail, Los Gatos, CA (US)

(73) Assignee: ZeroNorth, Inc., Boston, MA (US)

( * ) Notice: Subject to any disclaimer, the term of this patent is extended or adjusted under 35 U.S.C. 154(b) by 295 days.

(21) Appl. No.: 16/253,944

(22) Filed: Jan. 22, 2019

(65) Prior Publication Data
US 2019/0229915 A1    Jul. 25, 2019

Related U.S. Application Data

(60) Provisional application No. 62/620,830, filed on Jan. 23, 2018.

(51) Int. Cl.
*H04L 9/32* (2006.01)
*H04L 29/06* (2006.01)
(Continued)

(52) U.S. Cl.
CPC .............. *H04L 9/321* (2013.01); *G06F 21/00* (2013.01); *H04L 63/0428* (2013.01); *H04L 63/08* (2013.01); *H04L 63/20* (2013.01); *G06F 8/65* (2013.01); *G06F 16/27* (2019.01); *H04L 2209/38* (2013.01)

(58) Field of Classification Search
CPC ......... H04L 9/321; H04L 63/20; H04L 63/08; H04L 63/0428; H04L 2209/38; H04L 9/3239; H04L 9/0891; G06F 21/00; G06F 16/27; G06F 8/65; G06F 21/64; G06F 8/60
See application file for complete search history.

(56) References Cited

U.S. PATENT DOCUMENTS 8,832,828 B2   9/2014 Lyne et al.
8,918,775 B1   12/2014 Carpenter et al.
(Continued)

OTHER PUBLICATIONS

U.S. Appl. No. 16/169,951, Non-Final Office Action dated Feb. 27, 2020, 33 pages.
(Continued)

*Primary Examiner* — Aravind K Moorthy
(74) *Attorney, Agent, or Firm* — Han Santos, PLLC

(57) ABSTRACT

Event metadata may be received at an audit function of an orchestration system for an infrastructure change event associated with an infrastructure change to an enterprise infrastructure of an enterprise. A blockchain instance of a particular decentralized secure ledger is requested from a decentralized secure ledger service via the audit function. A user identifier of a user that is responsible for the infrastructure change event is provided to the decentralized secure ledger service by the audit function. In response to the decentralized secure ledger service authenticating the user identifier, the event metadata for the infrastructure change event is sent to the blockchain instance for storage with the decentralized secure ledger service by the audit function.

22 Claims, 11 Drawing Sheets

(51) Int. Cl.
*G06F 21/00* (2013.01)
*G06F 16/27* (2019.01)
*G06F 8/65* (2018.01)

(56) References Cited

U.S. PATENT DOCUMENTS

| | | | |
|---|---|---|---|
| 10,447,483 B1* | 10/2019 | Su | H04L 9/0643 |
| 10,579,361 B1* | 3/2020 | Gerraty | H04L 67/34 |
| 10,885,159 B2* | 1/2021 | Smaiely | G06Q 20/4037 |
| 2005/0262233 A1 | 11/2005 | Alon et al. | |
| 2008/0172664 A1* | 7/2008 | Nduaguba | G06F 8/61 |
| | | | 717/174 |
| 2008/0270727 A1* | 10/2008 | Jacobson | G06F 11/2082 |
| | | | 711/168 |
| 2010/0100535 A1 | 4/2010 | Melancon | |
| 2011/0126099 A1 | 5/2011 | Anderson et al. | |
| 2011/0302640 A1* | 12/2011 | Liu | H04W 12/06 |
| | | | 726/6 |
| 2013/0254755 A1 | 9/2013 | Yousouf et al. | |
| 2014/0006685 A1* | 1/2014 | Peterson | G06F 3/0688 |
| | | | 711/102 |
| 2014/0226404 A1* | 8/2014 | Lee | G11C 16/04 |
| | | | 365/185.11 |
| 2014/0237550 A1 | 8/2014 | Anderson et al. | |
| 2015/0134677 A1* | 5/2015 | Abuelsaad | G06F 16/242 |
| | | | 707/756 |
| 2015/0178066 A1* | 6/2015 | Horn | H04L 41/22 |
| | | | 717/161 |
| 2015/0309769 A1* | 10/2015 | Greene | G06Q 10/06 |
| | | | 717/104 |
| 2015/0365437 A1 | 12/2015 | Bell, Jr. et al. | |
| 2016/0085543 A1 | 3/2016 | Islam et al. | |
| 2016/0087854 A1 | 3/2016 | Venkata et al. | |
| 2016/0088021 A1 | 3/2016 | Venkata et al. | |
| 2016/0299933 A1 | 10/2016 | Fillipi et al. | |
| 2016/0342989 A1 | 11/2016 | Davis | |
| 2017/0017795 A1 | 1/2017 | Digiambattista | |
| 2017/0124556 A1 | 5/2017 | Seger | |
| 2017/0153914 A1* | 6/2017 | Rausch | G06F 16/24532 |
| 2017/0178019 A1* | 6/2017 | Duggan | G06N 7/00 |
| 2017/0213221 A1* | 7/2017 | Kurian | G06Q 20/38215 |
| 2017/0214675 A1* | 7/2017 | Johnsrud | H04L 9/3236 |
| 2017/0228371 A1 | 8/2017 | Seger | |
| 2017/0230285 A1 | 8/2017 | Crabtree et al. | |
| 2017/0372080 A1* | 12/2017 | Gordon | G06F 9/45558 |
| 2018/0082296 A1* | 3/2018 | Brashers | G06Q 20/405 |
| 2018/0176229 A1* | 6/2018 | Bathen | H04W 12/106 |
| 2018/0183606 A1* | 6/2018 | High | H04L 9/3239 |
| 2018/0217827 A1* | 8/2018 | Arcese | G06F 8/61 |
| 2018/0316502 A1* | 11/2018 | Nadeau | H04L 9/0637 |
| 2019/0058592 A1* | 2/2019 | Wright | G06Q 20/3827 |
| 2019/0139168 A1* | 5/2019 | Agassi | G06F 16/27 |
| 2019/0179672 A1* | 6/2019 | Christidis | G06F 9/5038 |
| 2019/0182254 A1* | 6/2019 | Christidis | H04L 9/0637 |
| 2019/0207965 A1* | 7/2019 | Espinosa | G06F 21/606 |
| 2019/0221225 A1* | 7/2019 | Bricklin | G06F 3/167 |
| 2019/0236316 A1* | 8/2019 | Watkins | G06F 16/152 |
| 2019/0259274 A1* | 8/2019 | Avery | H04L 67/12 |
| 2019/0273610 A1* | 9/2019 | Fan | H04L 9/34 |
| 2019/0327193 A1* | 10/2019 | Kuncheria | H04L 67/1095 |
| 2019/0354943 A1* | 11/2019 | Mulye | H04N 21/2407 |
| 2019/0392050 A1* | 12/2019 | Weil | G06F 16/176 |
| 2019/0394023 A1* | 12/2019 | Menon | H04L 9/3242 |
| 2020/0005404 A1* | 1/2020 | Patterson | G06F 9/4411 |
| 2020/0044918 A1* | 2/2020 | Byers | H04L 63/123 |
| 2020/0065697 A1* | 2/2020 | Watson | G06Q 10/06393 |
| 2020/0073651 A1* | 3/2020 | Rodriguez Bravo | H04L 63/123 |
| 2020/0097882 A1* | 3/2020 | Alagappan | G06F 40/174 |
| 2020/0111104 A1* | 4/2020 | George | G06F 16/23 |
| 2020/0119936 A1* | 4/2020 | Balasaygun | H04L 12/1831 |
| 2020/0125656 A1* | 4/2020 | Li | G06F 11/3006 |
| 2020/0134163 A1* | 4/2020 | Courtney | H04L 9/3297 |
| 2020/0134189 A1* | 4/2020 | Carter | H04L 9/3239 |
| 2020/0142682 A1* | 5/2020 | Marks | G06F 8/65 |
| 2020/0167773 A1* | 5/2020 | Cervenka | G06F 16/27 |

OTHER PUBLICATIONS

International Application No. PCT/US2018/042357, International Search Report and Written Opinion dated Sep. 27, 2018, 12 pages.
International Application No. PCT/US2019/014837, International Search Report and Written Opinion, dated Apr. 24, 2019, 10 pages.
International Application No. PCT/US2019/014846, International Search Report and Written Opinion, dated Apr. 29, 2019, 17 pages.
Liang et al. "Provchain: A blockchain-based data provenance architecture in cloud environment 1-15with enhanced privacy and availability." In: Proceedings of the 17th IEEE/ACM international symposium on cluster, cloud and grid computing. May 2017 (May 2017) Retrieved on Mar. 30, 2019 (Mar. 30, 2019) from entire document.
U.S. Appl. No. 15/658,022, Non Final Office Action dated Oct. 2, 2018, 16 pages.

* cited by examiner

TRUSTED VERIFICATION OF CYBERSECURITY REMEDIATION

CROSS-REFERENCE TO RELATED APPLICATION

This application claims priority to U.S. Provisional Patent Application No. 62/620,830, filed on Jan. 23, 2018, entitled "Trusted Verification of Cybersecurity Remediation," which is hereby incorporated by reference in its entirety.

BACKGROUND

Present day enterprises have come to rely on mission-critical computing systems. Such systems may include automation for accounting, finance, human resources, and other enterprise automation. Without automation, enterprises might not be able to service a large number of customers, would not be able to quickly determine who they owed money to or who owed them money, or be able to collaborate on work product. Indeed, if an enterprise's automation were to be compromised, that enterprise may run the risk of facing losses tantamount to going out of business. Accordingly, the ability for an enterprise to protect, backup, and recover from automation failures and threats is tantamount to ensuring not only the enterprise's health, but indeed its survival.

Accordingly, various vendors have made product offerings to safeguard enterprise systems and data. Examples include: Qualys™, Check Point Software™ and Fortinet™. However, different safeguarding software systems, may each have a different focus. One system may protect server-side computing instances, but may not protect client-side software. Another system may provide proactive security scanning, but may not offer recovery assistance in the case of compromise. Worse, rather than working in concert, different systems may inadvertently act against each other.

Accordingly, enterprises have turned to installing a number of safeguarding software systems to automate the protection, backup, recovery of their mission-critical computing systems. However, presently, there is no technology to orchestrate the response of these diverse safeguarding software systems in a unified and coherent fashion. Furthermore, as a consequence of there being no present orchestration technology, there is no present way for enterprises to perform orchestrated self-healing and response in the event of a security breach.

BRIEF DESCRIPTION OF THE DRAWINGS

The Detailed Description is set forth with reference to the accompanying figures.

DETAILED DESCRIPTION

Figure 1:
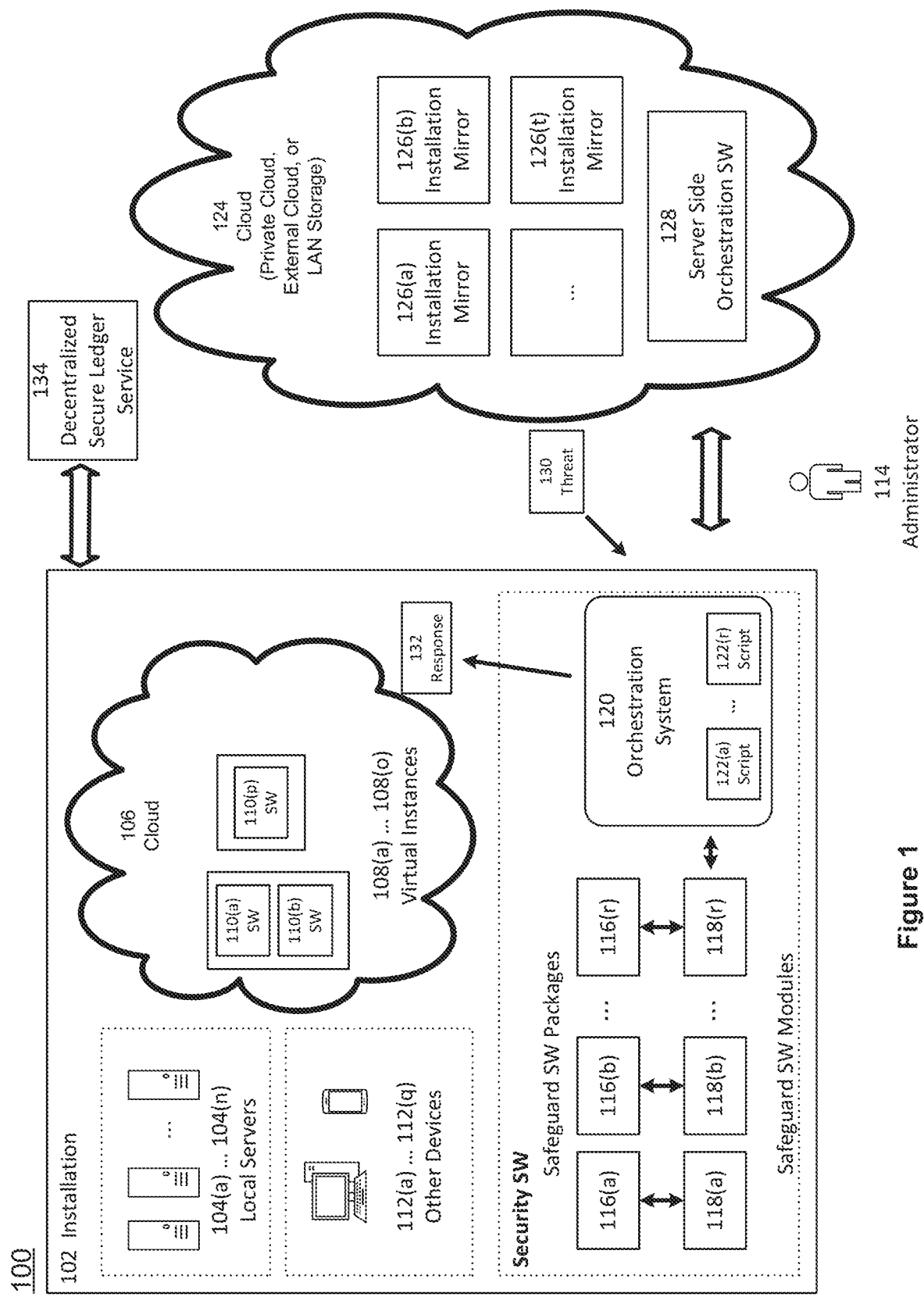
FIG. 1 is a top-level context diagram of enterprise-level security orchestration.

Presently there is an unmet need to perform enterprise-level security orchestration. Herein is described a system and methods to provide such enterprise-level security orchestration. As described above, there presently exist a number of commercial enterprise safeguarding systems for enterprises. These systems can perform threat scanning, mirroring, recovery, and other functions. However, typical large enterprises will deploy several of these safeguarding systems, and presently those safeguarding systems are not orchestrated to act in concert. There exist a large number of scenarios, such passive and active scanning, end to end threat penetration testing, and application recovery, where the several deployed safeguarding systems would be used in concert. In the scanning instance, an enterprise may desire to first run a scan using Qualys™ and afterwards run a scan using BeyondTrust™ to ensure that the latter caught what the former might have missed.

The orchestration function may be met by providing an orchestration system where different safeguard software packages, such as Qualys™, Check Point™, and Fortinet™ have corresponding safeguard software modules to interface a respective safeguard software package with the orchestration system. In this way, the orchestration system could run orchestration routines that utilized some or all of the safeguard software packages to perform security testing or other security functions on the enterprise.

Addressing the above would provide the orchestration portion of enterprise-level security orchestration. However, to make the security orchestration function enterprise level, the present system ideally would have the ability to perform security testing and other security functions isolated from production systems. Accordingly, the orchestration system would have access to a mirror of the entire enterprise, in effect creating an enterprise size sandbox. Because of the amount of data for the enterprise, there are technical challenges addressed herein to enable timely, enterprise scope sandboxing.

Accordingly, preparing an orchestration system, interfaced with various safeguard software packages via corresponding safeguard software modules, with access to storage sufficient for enterprise-scale mirroring, and mirroring functions with sufficient performance to perform mirroring in a timely fashion, would provide enterprise-level security orchestration.

Enterprise level security orchestration enables security testing and safeguarding functions that are functions that support a security scenario. Scenarios include, without limitation:

Vulnerability scanning,
Active scanning,
Penetration test scanning,
Web application scanning,
End to end scanning,
Software development scanning, Pre-release scanning,
White hat/Tiger team methodology scanning
Remediation management, and
Reporting management.

The above scenarios need not be performed in a vacuum. Many of the above scenarios are performed in concert with other enterprise operations. By way of example, consider developer operations which comprise a development life cycle and a test life cycle. Specifically, when enterprise critical applications are developed, they are typically developed according to a software development methodology, which compartmentalizes different phases of development. In doing so, the methodology offers checkpoints where work product, such as documentation and working code, may be tested. By detected potential problems early in development, those problems if properly corrected will not propagate through the system.

One example of a software development methodology is called the "waterfall model." In the waterfall model, software is roughly subdivided into the following phases. The first phase is "strategy" where the goals of the project are identified and sponsorship/funding is secured. The second phase is "requirements" where what the software is to do, is specified in a formal requirements document. The third phase is "design" where how the software is to be implemented is specified in a formal design document. For example, the requirements document may specify that four fields are to be used to specify an employee. The design document may show an input form for the employee and specify the use of Visual C# and a .NET runtime for implementation. The fourth phase is implementation, where the design is coded. The fifth phase is testing, where the coded project is put into acceptance testing, and bugs are fixed. Upon passing acceptance, the sixth phase is deployment, where the software is rolled out to production.

In the waterfall model, enterprise-level security orchestration may be applied during the test phase as part of acceptance testing. While it is not expected that information technology developers will introduce malware, their preliminary code might introduce security flaws, such as open ports or unintentionally unsecured modules. Those and other security problems may accordingly be detected via enterprise-level security orchestration.

Presently, more contemporary software development methodologies have become more iterative. Specifically, because it was possible to hold up development until the completion of a comprehensive functional requirements document, software development methodologies, such as "Agile", arose in response where development was subdivided across multiple development efforts of smaller and more discrete software features. Developing on such feature could be done in a short period of time called a "sprint". Accordingly, development of a single software product might comprise multiple sprints.

Enterprise level security orchestration lends itself very well to contemporary software development methodologies. Enterprise level security orchestration may be applied to the software product under development after each sprint. Because of the scalable nature of enterprise-level security orchestration, multiple mirrors of an installation may be tested for security, synchronously. Synchronous testing is described in greater detail with respect to FIG. 5. Thus, enterprise-level security orchestration may be integrated with development operations, including contemporary Agile software development methodologies, as well as other enterprise operation methodologies.

Exemplary Context Diagram of Enterprise Level Security Orchestration

FIG. 1 provides an exemplary context diagram 100 for enterprise-level security orchestration. Enterprises have an information technology installation 102 comprising all computing, networking, and storage devices used by the enterprise and their software. An installation may include several local servers 104(a) through 104(n), sited on the enterprise's premises. An installation may also include cloud infrastructure 106 provided by one or more cloud providers on one or more cloud virtual instances 108(a) through 108(o). On those local servers 104 and/or the cloud virtual instances 108, the enterprise may install enterprise software systems 110(a) through 110(p) that automate enterprise operations across the enterprise, such as accounting, finance, customer relations management.

An installation 102 is not limited to server side. An installation may include other devices 112(a) through 112(q) that may include client personal computers, tablets, cell phone, and other mobile devices, along with their respective client software.

An installation 102 is generally overseen by an administrator 114, whose responsibilities include the security of the installation 102. Accordingly, the administrator 114 will typically deploy a number of commercially available safeguard software packages 116(a) through 116(r). As described above, exemplary safeguard software packages 116 may include, but are not limited to, Qualys™, Check Point Software™ and Fortinet™. In general, a safeguard software package 116 is any software package deployed by the administrator to perform a safeguarding or security function that is to work with the other safeguard software packages 116.

Each safeguard software package 116, has a corresponding safeguard software module 118(a) through 118(r). Because different safeguard software packages 116 have different means of automation and different functions, and because the safeguard software packages 116 are likely to have changing versions over time, the safeguard software module 118 provides a layer of software to provide a consistent interface to abstract away the changing nature of the underlying safeguard software packages 116.

The safeguard software modules 118 interface to an installation side orchestration system 120. The orchestration system provides the administrator 114 with a user interface, including a dashboard to receive notifications and alerts from the safeguard software packages 116 in an integrated fashion.

From time to time, the administrator may choose to automate the safeguard software packages 116, generally in concert with each other. This is accomplished via, orchestration routines specified by scripts 122(a) through 122(r). An orchestration routine is a script which can make calls to the safeguard software packages 116, via the automation interfaces provided by the safeguard software modules 118. Specifically, after an administrator programs and deploys a script 122 to run at specified times and/or specified intervals, the orchestration system 120 will run the script 122 at the appointed time via a runtime that is part of the orchestration system. When the script invokes a call to a safeguard software package 116, the runtime will call the respective safeguard software module 118, which in turn performs the automation call specific to the safeguard software package 116. For example, if the safeguard software package 116 proffers a Component Object Module or .NET™ interface, the safeguard software module 118 will be configured to invoke such interfaces. If the safeguard software package 116 does not have native automation, automation may be performed through alternatives, such as journaling hooks.

Because the orchestration system 120 executes the scripts 122, it also receives all the results of the safeguarding and security operations such as passive and active scans. Accordingly, the orchestration system can include an analytics function which stores the results, performs analysis, and detects patterns of threats. In this way, the administrator 114 may change the configuration of the safeguard packages to close off threats. In some cases, the orchestration system 120 may automatically respond to close off threats. Such automation may also be performed by programmed scripts 122.

Scripts 122 may implement different security methodologies. Accordingly, an advantage of the centralized orchestration system 120, is the ability of the administrator 114 to implement multiple methodologies across multiple safeguard software packages 116.

As described above, it may be desirable to perform security and safeguard functions isolated from production systems. An example scenario includes testing software or data, prior to incorporation into production. In such a scenario, it is desirable to replicate all, or part of an installation 102. Because of the cloud, storage costs have dropped sufficiently to make large scale replication feasible. Alternatively, a well-funded enterprise could opt to implement a private cloud and have the replication storage local on premises. Finally, commercial software, such as Actifio™ provides the means to perform timely replication of an entire or a portion of an installation 102.

Accordingly, cloud 124 may be external or alternatively on premises. Cloud 124, provides storage and infrastructure to host full or partial mirrors 126($a$) through ($t$) of installation 102. The server-side orchestration software 128 is communicatively controlled by the orchestration system 120. It provides coordination of the creation/destruction of mirrors 126, of the installation 102. The server-side orchestration software 128 also provides for performing security testing and safeguarding functions on the mirrors 126.

One way to make use of a mirror 126 is to perform testing on the mirror sequentially and asynchronously. For example, an administrator 114 may perform a scan using Qualsys™ first, and thereafter may scan using BeyondTrust™.

However, an advantage of the present system is that multiple mirrors 126 of the same enterprise installation 102 may be made. Accordingly, in the above scenario, two mirrors 126 could be made, and Qualsys™ run on the first and BeyondTrust™ run on the second. In this way, scanning is performed synchronously and the time to perform the scans could be substantially reduced to the time of a single scan. Synchronous scanning is described in further detail with respect to FIG. 5.

Beyond time savings, an administrator 114 may make mirrors 126 corresponding not only to safeguard software packages 116, but also to methodologies. Thus, if the administrator 114 wished to run five different methodologies, using multiple safeguard software packages 116, that could be achieved by creating a mirror 126 for each methodology. Thus, an administrator is more likely to detect threats and breaches. Mirrors 126 may be destroyed at will. Accordingly, any security threat detected is destroyed, and data replicas will not persist thereby creating the security risk that the data replicas are breached. As previously mentioned, mirrors 126 are isolated from production. When scans are performed on production, often production performance suffers due to the computing resource load of the scan. However, since mirrors 126 are isolated from production, a scan on a mirror 126 will not affect production performance. Accordingly, it is feasible to run continuous scans without adversely impacting the enterprise.

The orchestration system 120 and by extension the server side orchestration software 128, include an analytics collector, a remediation engine, and a security reporting module. Thus, the orchestration system 120 has the ability to detect a threat 130, and correspondingly to make a response 132. The internals of the orchestration system 120 and the server side orchestration software 128 are described in further detail with respect to FIG. 4. The orchestration system 120 also has automatic remediation capabilities including the ability to generate remediation measures and rollback information and to automatically deploy updates and remediation measures. Automatic remediation is described in further detail with respect to FIGS. 6 and 7. Automatic deployment options are described in further detail with respect to FIGS. 8 and 9.

Exemplary Hardware, Software and Communications Environment

Figure 2:
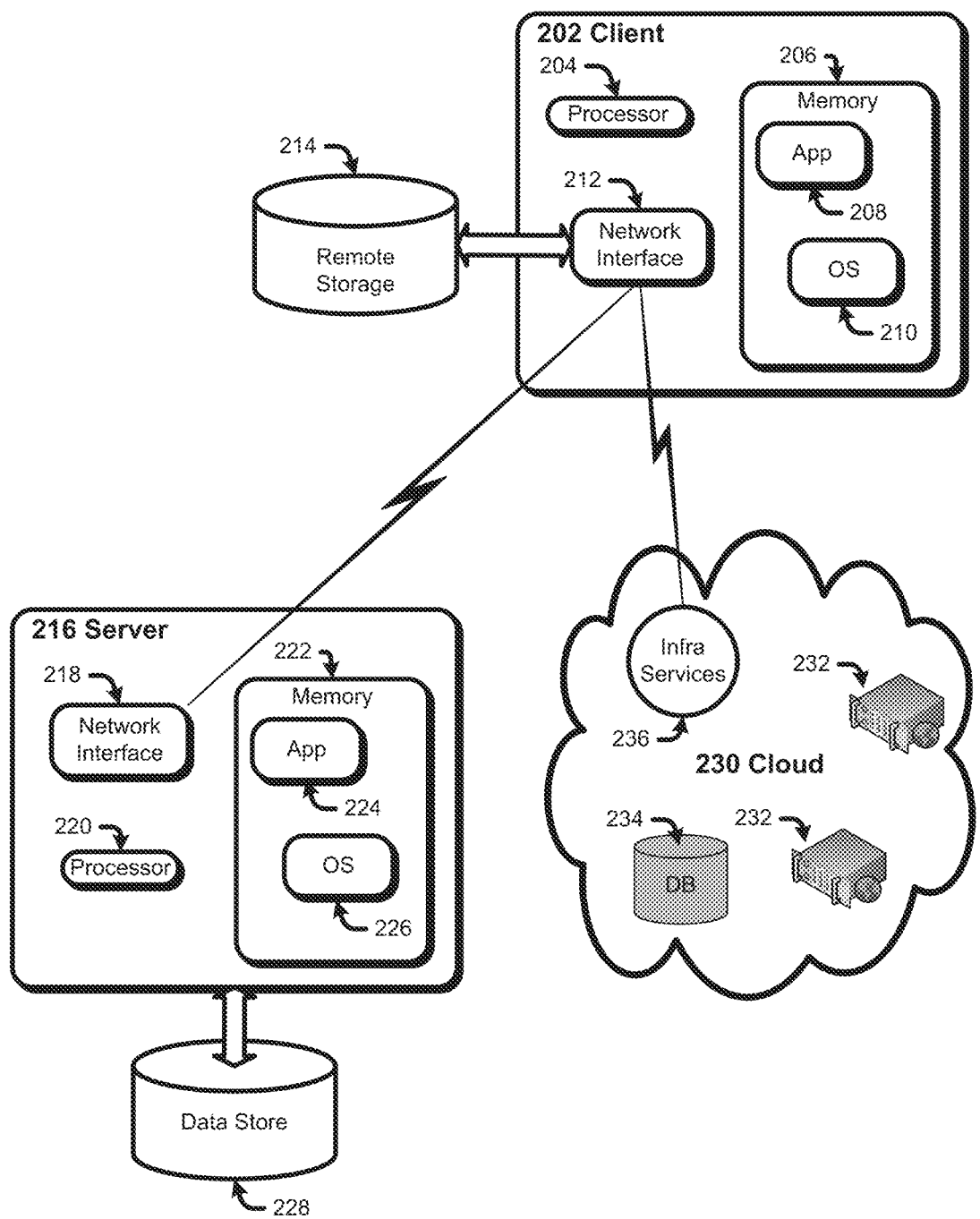
FIG. 2 is an environment diagram illustrative of hardware, software and communications infrastructure for enterprise-level security orchestration.

Prior to disclosing enterprise-level security orchestration and related techniques, exemplary hardware, software, and communications environment is disclosed. FIG. 2 illustrates several possible embodiments of a hardware, software and communications environment 200 for enterprise-level security orchestration and related techniques. Client device 202 is any computing device. Exemplary computing devices include without limitation personal computers, tablet computers, smartphones, and smart televisions and/or media players.

Enterprise level security orchestration and related techniques may be used in a number of platform contexts. Although enterprise-level security orchestration and related techniques may be brought to bear on a typical networked client device 202 accessing a remote server, enterprise-level security orchestration and related techniques alternatively may be implemented on a networked computer. Accordingly, those techniques might be performed on a client device 202 that is a personal computer or alternatively a portable laptop.

A client device 202 may have a processor 204 and a memory 206. Client device 202's memory 206 is any computer-readable media which may store several software components including an application 208 and/or an operating system 210. In general, a software component is a set of computer-executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD), Blu-Ray or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanisms. As defined herein, computer storage media does not include communication media.

To participate in a communications environment, client device 202 may have a network interface 212. The network interface 212 may be one or more network interfaces including Ethernet, Wi-Fi, or any number of other physical and data link standard interfaces. In the case where the user need only do operations on a standalone single machine, the network interface 212 is optional.

Client device 202 may communicate to a server 216. Server 216 is any computing device that may participate in a network. The network may be, without limitation, a local area network ("LAN"), a virtual private network ("VPN"), a cellular network, or the Internet. The client network interface 212 may ultimately connect remote networked storage 214, or to server 216 via server network interface 218. Server network interface 218 may be one or more network interfaces as described with respect to client network interface 212.

Server 216 also has a processor 220 and memory 222. As per the preceding discussion regarding client device 202, memory 222 is any computer-readable media including both computer storage media and communication media.

In particular, memory 222 stores software which may include an application 224 and/or an operating system 226. Memory 222 may also store applications 224 that may include without limitation, an application server and a database management system. In this way, client device 202 may be configured with an application server and data management system to support a multi-tier configuration. Server 216 may include a data store 228 accessed by the data management system. The data store 228 may be configured as a relational database, an object-oriented database, a NoSQL database, and/or a columnar database, or any configuration to support scalable persistence.

The server 216 need not be on site or operated by the client enterprise. The server 216 may be hosted on the Internet on a cloud installation 230. The cloud installation 230 may represent a plurality of disaggregated servers which provide cloud services 232 in the form of virtual web application server functionality and virtual database functionality. Cloud services 232 and 234 of the cloud installation 230 may be made accessible via cloud infrastructure 236. Cloud infrastructure 236 not only provides access to cloud services 232, 234 but also billing services. Cloud infrastructure 236 may provide additional service abstractions such as Platform as a Service ("PAAS"), Infrastructure as a Service ("IAAS"), and Software as a Service ("SAAS"). The cloud services 232 and 234, as well as the cloud infrastructure 236, may also support the implementation of other services, such as the decentralized secure ledger service 134.

Orchestration Software

Figure 3:
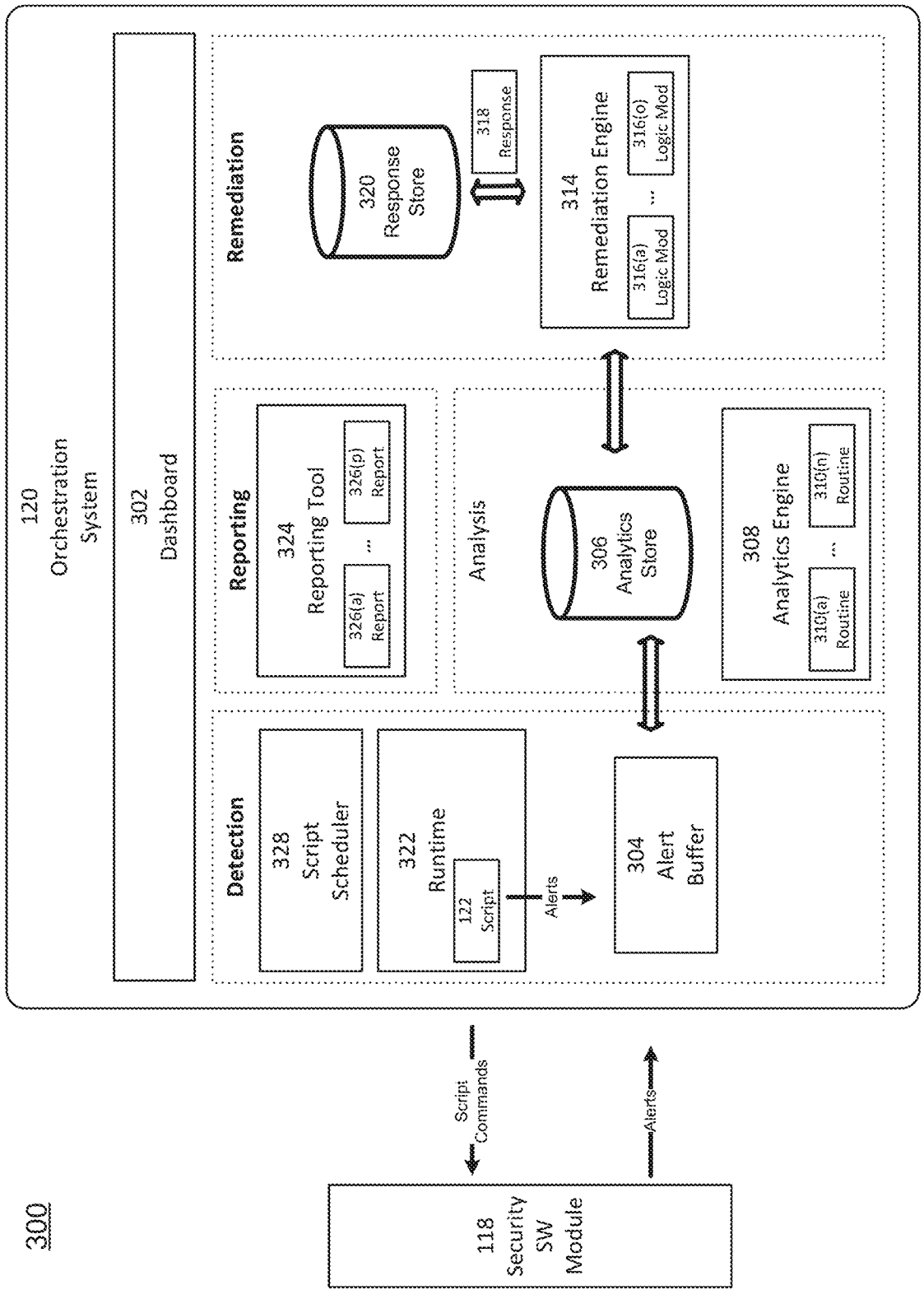
FIG. 3 is a block diagram for enterprise-level security orchestration.

FIG. 3 is a block diagram 300 of the orchestration system 120 and the server side orchestration software 128. The orchestration system 120 includes a dashboard 302 that provides an integrated view of the security status of the installation 102. It may show scans in progress, status of scans present and historical, reports and recommendations, and it may show present alerts. Accordingly, there are at least three types of notifications: (1) alerts from individual software packages 116, (2) alerts from scans in progress as orchestrated via scripts 122, and (3) surfaced recommendations not specific to a scan.

To receive alerts from individual safeguard software packages 116, a safeguard software package 116 will send an alert which is intercepted by a safeguard software module 118. The safeguard software module 118 then adds metadata identifying the safeguard software package 116, and itself, the safeguard software module 118, and then forwards the alert and metadata directly to alert buffer 304. The dashboard 302, will then receive a notification that a new alert has been received in buffer 304 and will update the dashboard user interface accordingly.

To receive alerts from scripts 122, a runtime 322 will execute a script 122. The script will then receive alerts from safeguard software packages 116 as forwarded by the safeguard software modules 118. Alternatively, the script may create an alert of its own. The run time will then add metadata identifying the script 122, the mirror instance 126, the safeguard software package 116 and the safeguard software module 118 that provided the alert. Both types of alerts are then forwarded by the runtime to the alert buffer 304. The dashboard 302 updates again by receiving a notification from the alert buffer 304 as described above.

From time to time, the alert buffer 304 will populate an analytics store 306. An analytics engine 308 will then run analytics routines 310(a) through 310(n) from time to time to identify threats. When a threat 312 is detected, the analytics engine 308 will create a record and populate the analytics store 306.

A remediation engine 314 monitors the analytics store 306 and detects threat patterns. The detection may be through any number of remediation logic modules 316(a) through 316(o). A remediation logic module 316 may be a hardcoded script from an administrator 114. For example, the remediation logic module 316 may simply state that where unauthorized access is via an open port, the remediation logic module 316 is to close the port and surface a report. A remediation logic module 316 may employ a similarity measure and based on past behavior the administrator closed an open port upon detection of an unauthorized access, and the logic module 316 then closes all unused open ports proactively. A powerful remediation logic module 316 would be a module that implements any number of known machine learning algorithms to learn threats and to suggest responses 318. Responses 318 that are repeatedly accepted or used by the administrator are stored in response data store 320.

A reporting tool 324 creates reports 326(a) through 326(o) based on the records of the analytics store 306 and surfaces the availability of those reports on dashboard 302. In some cases, the reporting tool 324 make be invoked by the remediation engine 314 to surface recommended responses as recommendations.

Both threat data, as stored in the analytics store 306 and potential responses as stored in the response data store 320 need not be populated solely from scans of the installation. Third party data from the security community can also be loaded via the dashboard 302, thereby adding to the capabilities of the orchestration system 120. In general, the orchestration system 120 may aggregate data. A scheduler 328 is used to schedule the running of tests. Tests may be performed synchronously or asynchronously, in which the test results are stored by the scheduler 328 in the analytics store 306. Synchronous scheduling of tests is described in further detail with respect to FIG. 5. Thus, the orchestration system 120 aggregates and stores vulnerability and remediation data from various data sources for individual enterprise installations of multiple enterprises. Accordingly, the orchestration system 120 functions as a single authoritative source of vulnerability and remediation data for each enterprise installation of individual enterprises that are served by the orchestration system 120. For example, the orchestration system 120 may serve as a single authoritative source of vulnerability and remediation data for the enterprise installation 102 shown in FIG. 1.

Life Cycle of Enterprise Level Security Orchestration

Figure 4:
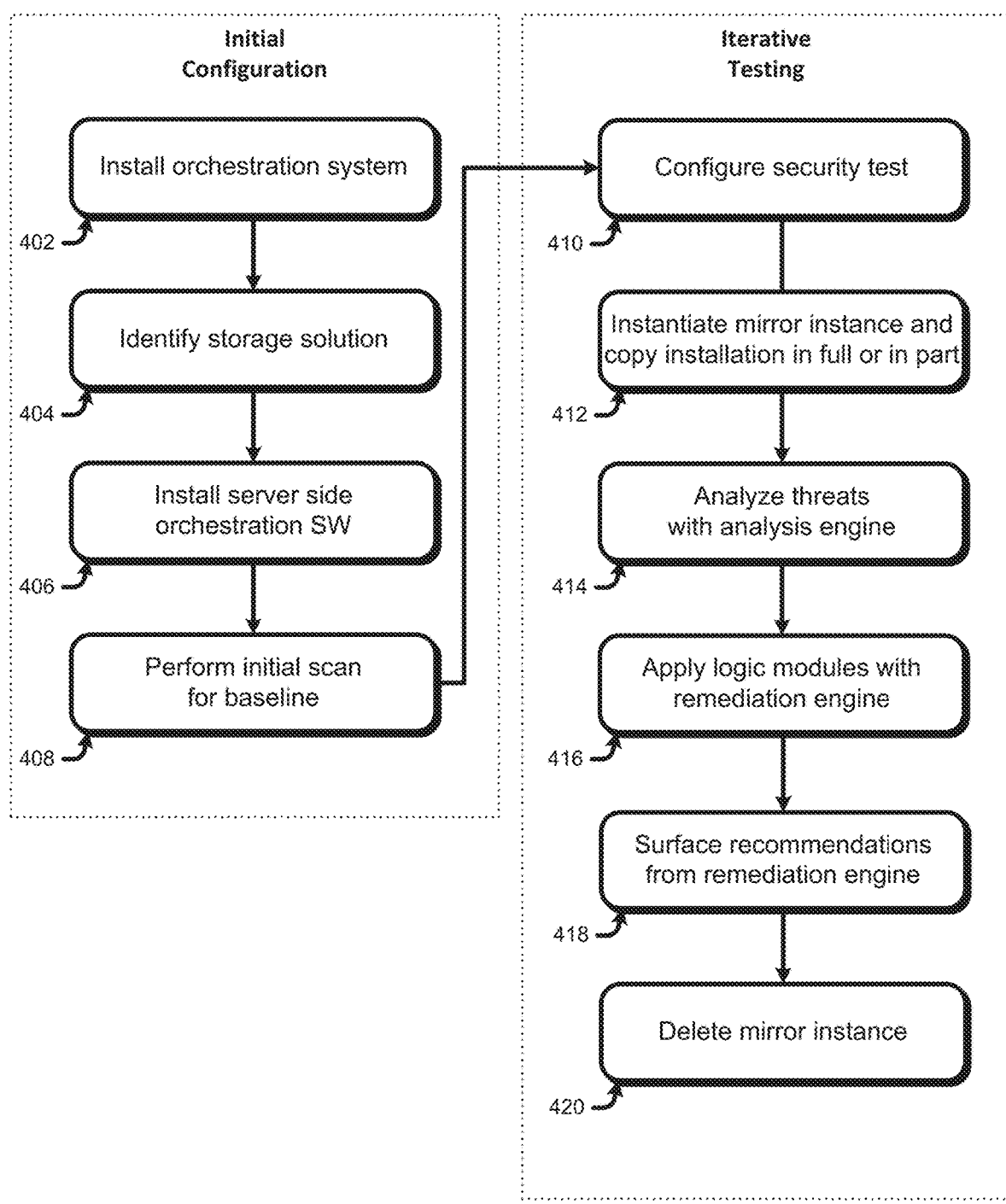
FIG. 4 is an illustration of the life cycle performing enterprise level security orchestration.

FIG. 4 is an illustration 400 of the life cycle of enterprise-level security orchestration starting with an initial deployment. After the deployment, illustration 400 shows an exemplary continuing operation for enterprise-level security orchestration.

In block 402, the orchestration system 120 is installed. This includes installing the safeguard software modules 118. Specifically, for every safeguard software package 116 installed, a corresponding safeguard software module 118 is installed and configured to interface the safeguard software package 116 to the orchestration software.

In block 404, a storage solution is identified. Generally, an external cloud storage solution is identified. However, alternatively a private cloud could also be implemented. In yet other embodiments, standard networked storage on a local area network may be chosen as well. Thus storage could be either external or on premises.

In block 406, the server side orchestration software 128 is installed. Where external cloud has been chosen in block 404, the server side orchestration software 128 will be configured to create mirrors 126 of the installation 102 on demand. Where local storage has been chosen, the server side orchestration software 128 will be configured to allow the safeguard software packages 116 to operate directly on mirrored data.

In block 408, an initial scan may be performed. The installation's configuration along with the initial scan thereby provide a data baseline for the security state of the installation 102. At this point, the orchestration system 120 is ready for operations.

In block 410, the orchestration system 120 will be configured by an administrator 114 to run a particular security test, to perform continuous scanning, or to execute a script 122. The orchestration system 120 will then perform the request as scheduled. Generally, the request will be performed on a mirror 126.

On demand, by the orchestration system 120, in block 412, an installation 102 is mirrored in full or in part. The mirror 126 generally will include at least one application, as it would be installed in production, and a snapshot of the application's data. In the case of external cloud, copies of the safeguard software packages 116 and their respective safeguard software modules 118 will also be installed. Note that because the safeguard software packages 116 is also mirrored in block 412, versioning of the safeguard software packages 116 need not be tracked. The administrator 114 need only ensure that the safeguard software modules 118 match the safeguard software packages 116, and the safeguard software modules 118 are properly configured prior to mirroring.

Generally replicating installations 102 is a time-consuming process. However, commercial software, such as Actifio™ may be used to create mirrors in a timely fashion. Orchestration of replication is to be performed by the server side orchestration software 128.

During the performance of the security tests, in block 410, threats and alerts are detected by the security software packages 116, by scripts 122 and are stored in the alert buffer 304, and where alerts that are threats 312 are stored in an analytics store 306.

In block 414, an analytics engine 308 analyzes the threats 312 in the analytics store 306 to detect threat patterns. Upon detection of threat patterns, in block 416, a remediation engine 314 is engaged. The remediation engine 314 employs a number of remediation logic modules 316 to identify potential responses 318. In block 418, responses 318 are surfaced as recommendations to the dashboard 302. In some cases responses 318 are automatically executed.

Note that reporting can be done in conjunction with past scans. For example, a second scan could be compared to the initial scan performed in block 408. Instead of surfacing all issues, only new issues could be surfaced by removing all issues identified in the initial scan. In this way, a "delta report" could be generated.

In block 420, the mirror instance 126 may then be deleted. In this way the mirror instance 126 would not pose a security risk where data could be exposed. At this point, operation can return back to block 412 to perform another scheduled test.

Synchronous Scanning

The discussion with respect to FIG. 4 is described sequentially and asynchronously. However, as mentioned above, testing may be performed synchronously. The insight is that multiple mirrors 126 may be instantiated in storage, and therefore different tests may be performed in parallel. In particular, because different safeguard software packages 116 operate on an entire mirror, running two or more packages in parallel on the same mirror at the same time would likely create race conditions. By running the two safeguard software packages 116 each on their own respective mirror 126, race conditions are avoided.

Figure 5:
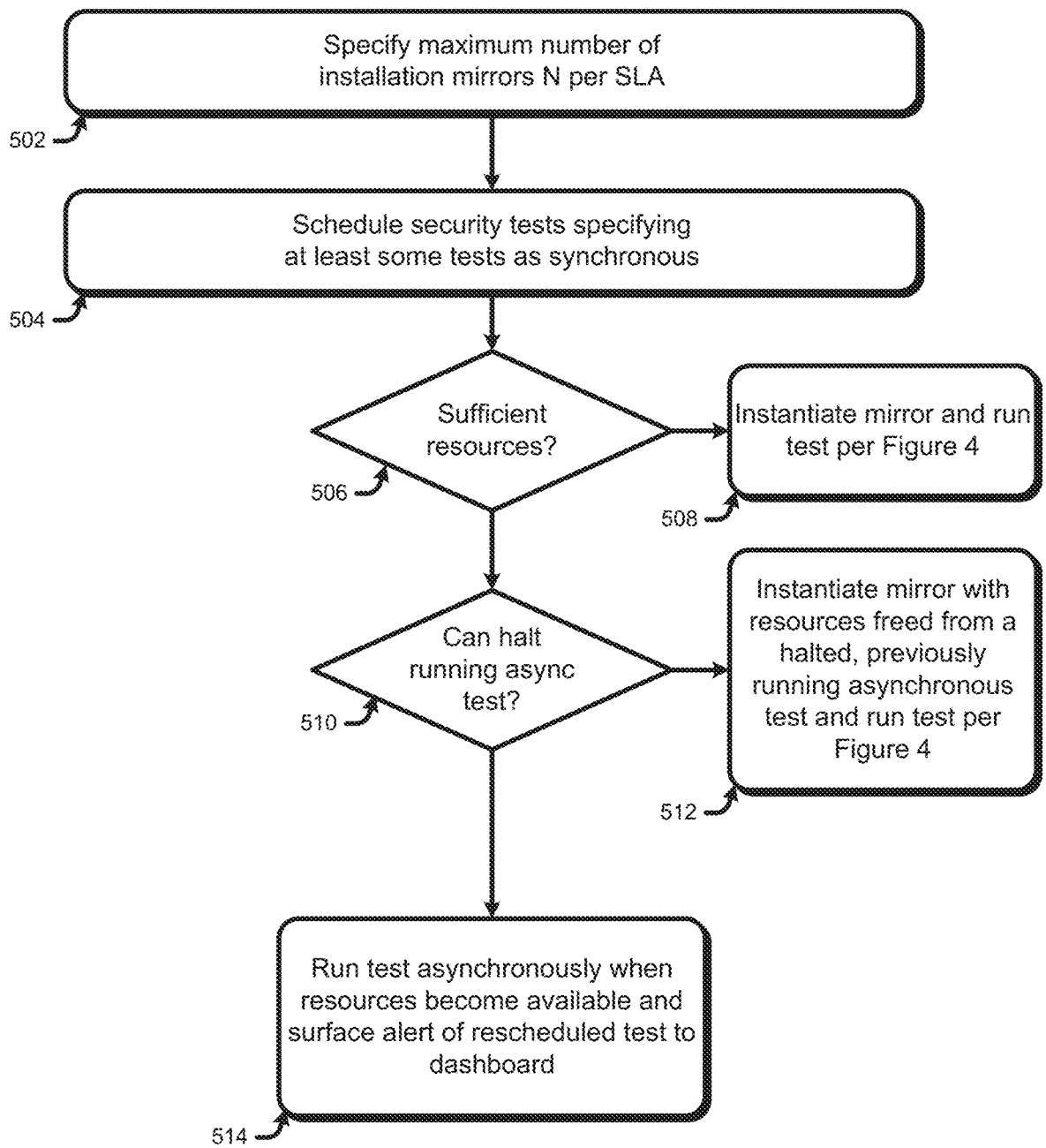
FIG. 5 is a flow chart for synchronous mirroring for enterprise-level security orchestration.

To perform synchronous scanning, tests are to be scheduled synchronously. The scheduling functionality is largely performed by the scheduler 328 in the orchestration system 120. FIG. 5 is a flow chart 500 describing synchronous scanning.

In block 502, an administrator 114 specifies the maximum number of mirrors N that are covered by a service level agreement (SLA) with the cloud provider of cloud 124. While theoretically, the cloud 124 could run an unlimited number of mirrors, the administrator 114 will have a limit N based on cost.

In block 504, the administrator 114 schedules security tests. Tests may be marked as synchronous. Alternatively, multiple tests could be scheduled to run at the same time, in which case the scheduler 328 assumes that the tests are to be run synchronously.

In block 506, if a test is scheduled at the present time, the scheduler 328 checks to see if there is sufficient capacity to create a mirror. If there is, in block 508, the mirror is instantiated, and the test is run as per FIG. 4. If there is insufficient capacity, the scheduler 328 checks to see if there is a currently running asynchronous test 510. If there is, then in block 512, the currently running asynchronous test is halted, a new mirror is instantiated using the newly freed resources, and the test is run as per FIG. 4. If no currently running asynchronous test can be identified, then in block 514 the scheduler 328 schedules test run asynchronously and an alert is surfaced to the dashboard. The scheduler can be set with options where a test that cannot be run synchronously is simply not run.

Billing Options

The present system and methods are also to support various billing models. Some options are described as follows. One model would be to charge per safeguard software package 116 configuration or per test. In this model, different safeguard software modules 118, corresponding to a safeguard software package 116 could be marked with an identifier such as a globally unique identifier (GUID). Whenever the package was detected as running, the dashboard 302 could track whether the package was used, for what purpose, and the frequency of use.

Another model would be to charge per mirrored instance. Because the server-side orchestration software 128 is responsible for mirroring, it could track the number of mirrors created and whether a test completed successfully. Individual mirrors could be tracked timestamp or alternatively via an identifier such as a GUID. In this way, the volume of computing resources could be tracked.

Automatic Remediation

Figure 6:
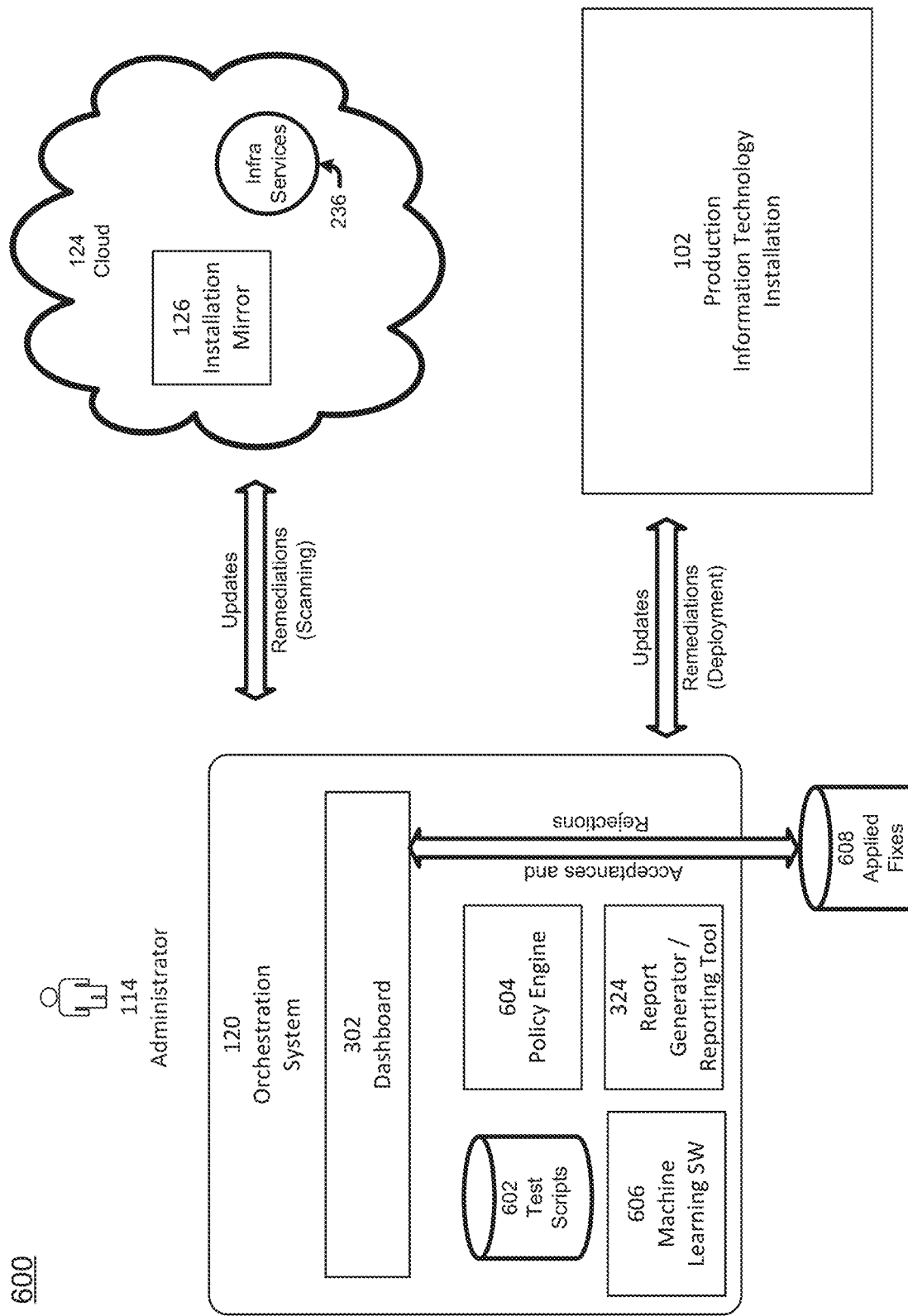
FIG. 6 is a block diagram for enterprise-level cybersecurity automatic remediation.
Figure 7:
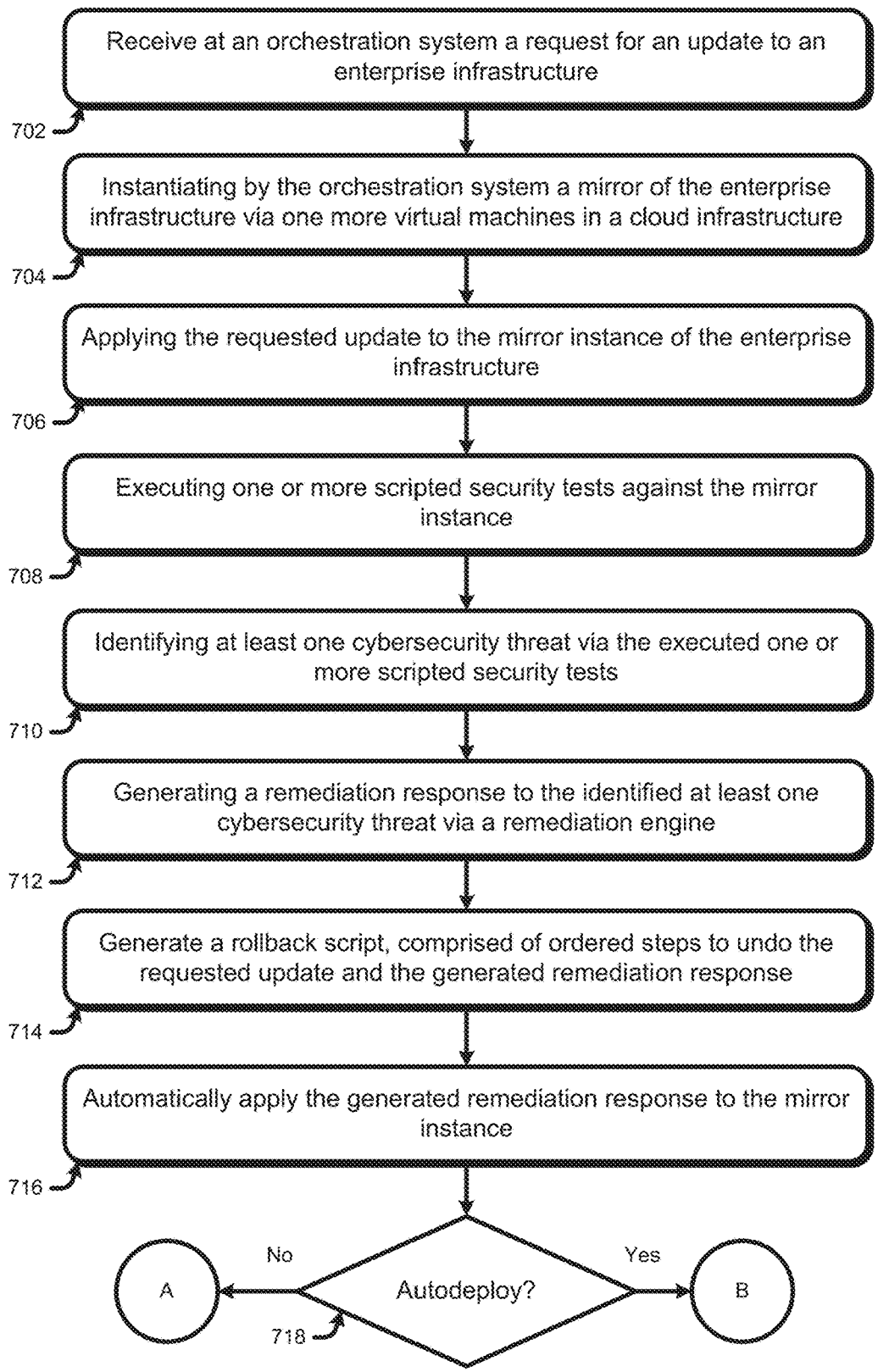
FIG. 7 is a flow chart for enterprise-level cybersecurity automatic remediation.
Figure 8:
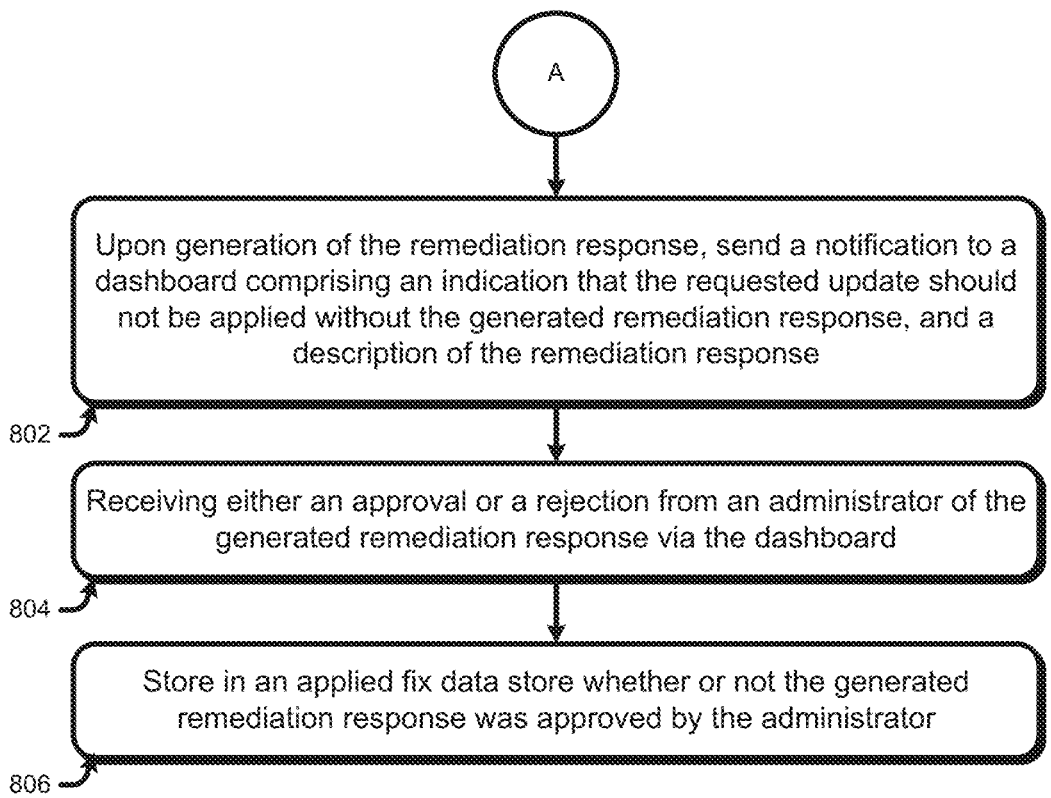
FIG. 8 is a flow chart for administrator authorized deployment of updates and remediation measures to production.
Figure 9:
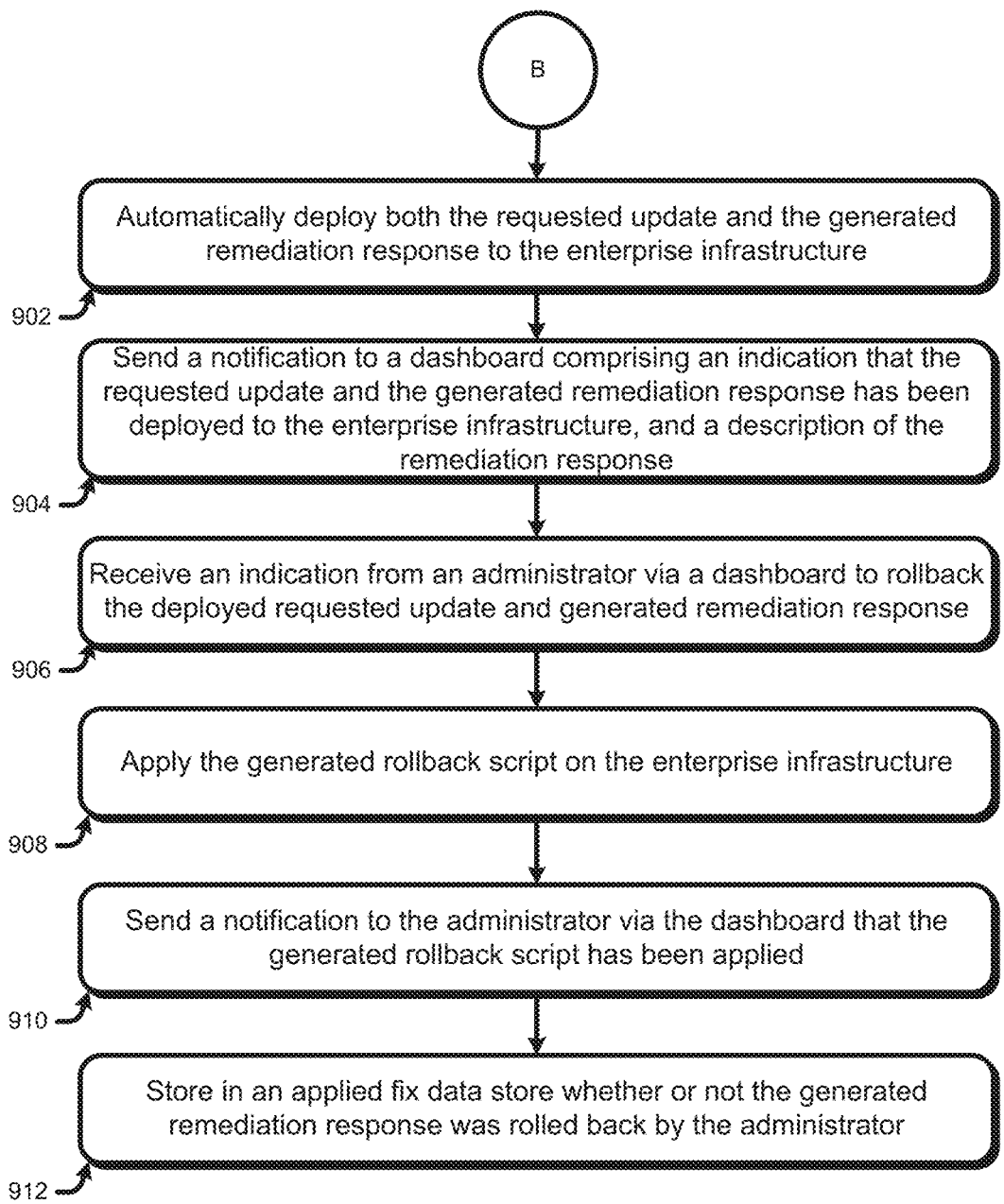
FIG. 9 is a flow chart for automatic deployment of updates and remediation measures to production, with rollback.

In one embodiment, the orchestration system 120 has automatic remediation capabilities. Specifically, the as updates are received, the orchestration system 120 may apply the update to an installation mirror 126, perform scans specified by the scripts 122 on the installation mirror 126 and detect cybersecurity threats. Where threats are detected, a remediation response may be generated and applied at the discretion of administrator 114 or alternatively may be automatically deployed. FIG. 6 is a block diagram 600 for automatic remediation. FIG. 7 is a flow chart 700 for automatic remediation. FIG. 8 is a flow chart 800 for administrator authorized deployment of updates and remediation measures to production. FIG. 9 is a flow chart 900 for automatic deployment of updates and remediation measures to product with rollback options. In general, FIG. 6's block diagram 600 illustrates additional components to the basic architecture set forth in FIG. 3 to support automatic remediation and is provided to for architectural context for flow charts 700, 800, and 900.

Turning to FIG. 7, in block 702, the orchestration system 120 receives a request to apply an update to an enterprise information technology installation 102. The updates may encapsulate additional functionality or bug fixes. Updates may come in the form of a configuration change to the operating environment, in the form of a code change, or in the form of a new or changed binary. An example of a configuration change may be a change to an operating system environment setting, or the closing of an unused network port. An example of a code change may be an amendment to a software script. An example of a binary change may be a replacement of a buggy dynamic link library, or the upgrade or addition of a new executable.

In block 704, the orchestration system 120 instantiates a mirror image 126 in cloud 124 via cloud infrastructure 236. As described above, the mirror image 126 provides a safe, non-production copy of the production environment for the enterprise information technology installation 102, to test the requested update prior to committing to a deployment to production. Accordingly, in block 706, the requested update is applied to the mirror image 126, wherein block 708 one or more scripts 122 for security tests are applied to the mirror images.

The scripts 122 for security tests may encapsulate a request to run a third party scanning tool, or alternatively may script internal scans and security checks. In one embodiment, the security tests as specified by the script 122 may be configured to the granularity of a single issue. Specifically, an issue may comprise a specific known single cybersecurity threat and the specific test or tests to detect that single cybersecurity threat. Single cybersecurity threats are often indexed and identified by a Common Vulnerability Exposure (CVE) identification number as provided by the Federal Government's National Institute of Standards and Technology (NIST). In this way, an applied test will have a one-to-one correspondence with a known issue, thereby enabling an administrator 114 to quickly identify the specific tests to detect specific cybersecurity threats. Instead of running a number of test suites, an administrator 114 can deliberately the correct subset of tests to execute upon receiving a notification of a specific cybersecurity threat.

In block 710, the executed security test scripts may identify one or more cybersecurity threats arising from the updates, or other threats that hitherto were not previously detected. In block 712, a policy engine 604, part of the remediation engine 314, may retrieve rules from a policy database identifying a remediation response for the identified cybersecurity threats. The policy database may be populated by responses provided by vendors, by other third parties, or identified by the administrator's organization. The remediation responses may be in the form of scripts that identify one or more specific configuration changes, code changes, or binary patches to apply, to neutralize the identified threats.

In other embodiments, the remediation response may be generated by a machine learning software 606, which identified other instances when similar cybersecurity threats were identified, and proposes the remediation responses used from those instances. In one embodiment, the machine learning software 606 may identify the remediation response from community database of applied fixes 608. The applied fixes database 608 is described later in the application.

The remediation response may be stored in a persistent common file format, such as JSON to enable sharing with third parties in a standardized format.

In addition to generating a remediation response, in block 714, a rollback script, that is a script to undo changes made upon application of the remediation response is generated. Specifically, the remediation response is comprised of an ordered sequence of steps including configuration changes, code changes, and binary additions and updates. The rollback script is generated by making an ordered sequence of steps, of the opposite operation in the remediation response, in reverse order. For example, a configuration change and a code change can both be undone. Where the code change is compiled, the code change may be backed out and the binary recompiled and redeployed. Older versions of binaries may be restored. In the case of registered DLLs such as COM or .NET DLLs, the old versions of the binaries may be reregistered if necessary. Thus a rollback script may be the opposite operations of the remediation response script performed in reverse order.

In block 716, the remediation response is applied on top of the update to the mirror image 126. At this point, in block 718, the orchestration system 120 may be configured either to await administrator approval to deploy the update and remediation response (option A), or alternatively to automatically deploy the update and remediation response to production (option B). The administrator approval process is described with respect to FIG. 8. The automatic deployment option process with rollback, is described with respect to FIG. 9.

Turning to FIG. 8, in this option (option A), the orchestration system 120, is configured to await administrator approval. In block 802, the administrator 114, is notified via dashboard 302, that the system has identified cybersecurity threats from the requested update and that the update should not be applied without also applying the generated remediation response. A description of the cybersecurity threats may be provided as well as a description of the generated remediation response. In some embodiments, the cybersecurity threat identified is that of a single issue, such as identified by a CVE.

Upon receiving the notification, the administrator 114 will have time to review the generated fix and to review the cybersecurity threats. The administrator 114 in block 804 may then send either an approval or a rejection of the update and/or generated remediation response. If an approval is received, then the update and/or the generated remediation response is deployed to the production enterprise information technology installation 102.

In block 806, the choice of the administrator 114 whether to approve or reject the updated and/or generated remediation response is stored in a community applied fix data store 608. The applied fix data store 608 stores the update, the issue, the remediation response and whether the administrator 114 accepted or rejected the update and/or remediation response. Furthermore, the administrator 114 has the option of providing user-generated content, such as comments, or an indication of the efficacy of the update and/or remediation response. Indications may include binary indications (e.g. like/not like), or a scalar indication (e.g. three out of five stars). Because the applied fix data store 608 may store the administrator choice on a per issue basis, i.e. a per CVE basis, choices from other parties may be aggregated with that of the administrator and like decisions compared.

Turning to FIG. 9, in this option (option B), the update and the generated remediation response is in block 902 automatically deployed to the production enterprise information technology installation 102.

During deployment, an audit function tracks the date time stamp that each step of the remediation response is performed. The reporting tool 324 may act as an audit reporting tool to provide the administrator 114 of all operations performed on the production enterprise information technology installation 102.

Upon deployment, in block 904, the administrator 114 is notified of the change via dashboard. The update, the nature of the identified cybersecurity threats, and description of the generated and applied remediation response may be included in the notification.

There may arise an occasion that the administrator 114 wishes to undo the automatic deployment. In such an occasion, in block 906, the administrator 114 may send a notification via the dashboard 302 to perform a rollback. In block 908, the rollback is effected via applying the generated rollback script to the production enterprise information technology installation 102.

In block 910, the administrator 114 is notified via dashboard 302 that the rollback has been successfully applied. Note that the rollback script may perform a rollback on the configuration and the binaries, but the administrator 114 may back out changes to data as well. In some embodiments, this backing out may be automated by reviewing the audit logs. Specifically, the audit logs store the date time stamp that the updates and the remediation response was applied, and all operations since. The rollback script may review the audit logs, identify all data changes and state changes from the time of the date time stamp that the original update and remediation response was applied, and back those changes out.

As with the administrator approval option, in the automatic deployment option, the choice of the administrator to apply and to rollback the update and the generated remediation response is stored in applied fix data store 608. Again, since the changes applied may be on a per issue basis, the choices of the administrator may be aggregated and compared with the choices of other third parties.

Community Applied Fixes

One of the features of the orchestration system 120 is that the behavior of the administrator 114 is stored in an applied fix data store 608 and aggregated with the behavior of other administrators from a wide variety of other enterprises. In this way, a statistically significant number of decisions regarding updates and generated remediation responses may be subjected to aggregation and machine learning analysis.

One attribute of the applied fix data store 608 is that updates and remediation responses identified are specific to an issue. In this way, like updates and responses may be compared to other like updates and responses. Another attribute of the applied fix data store 608 is that user-generated content may be applied both by the administrator 114 who made the decision, but also by commenting third parties. This user-generated content may be used by the machine learning software 606 to statistically weigh administrator decisions.

Since the applied fix data store 608 may be accessed by a community, there is the risk that malicious actors may attempt to pollute the data in the data store 608 with misinformation, in an effort to reduce the quality of the information in the data store 608. User-generated content may be limited to posts where the posting party provides an identity. Furthermore, the machine learning software 606 may aggregate posts by an individual identity and seek a pattern of incorrect user-generated content, and mark the individual identity as a malicious actor. At this point, the machine learning software 606 may be configured to give minimal or no weight to feedback provided by those individual identities. Alternatively, posts by the marked individual identity may be deleted and subsequent posts blocked. In this way, the machine learning software 606 may not only identify updates and generated responses from the community as posted to the applied fix data store 608, but may police the community itself.

Trusted Verification of Cybersecurity Remediation

The orchestration system 120 may on occasion provide verification of the application of remediation responses and infrastructure changes to an enterprise or a third-party. Such verification may be provided to the enterprise for the purpose of internal audits to ensure that particular remediation responses or preemptive measures are properly implemented. Such verification may be provided to the third party during an external audit for governance, insurance, or compliance purposes. For example, the verification may be provided for the purpose of showing that the enterprise has complied with U.S. Security and Exchange Commission (SEC) requirements or Sarbanes-Oxley regulations with respect to best practices for data retention or security. Such verifications may protect the enterprise from shareholder lawsuits or regulatory fines. Additionally, insurance carriers may request such verifications as a part of providing data breach or data loss insurance to the enterprise.

The orchestration system 120 may use a decentralized secure ledger service 134 to provide such verifications to an enterprise for internal audits, or to third parties on behalf of the enterprise for external audits. The decentralized secure ledger service 134 uses blockchain technology to store event metadata for infrastructure change events that occurred with respect to the enterprise. Blockchain technology refers to the use of a blockchain, or a continuously growing list of linked records, i.e., blocks, to store data. The linked records may be secured using cryptography such that each block contains a hash pointer that links the block to a previous block. Each block is configured to store transaction data and associated metadata, such as a timestamp, an identifier of the transaction, an event type of the transaction, and/or so forth. For the purpose of acting as a ledger of transactions, each block in the blockchain may be stored and managed by a computing device in a peer-to-peer network that implements a block validation protocol. This means that it is not possible to retroactively alter the transaction data stored in any particular block of the blockchain without altering all subsequent blocks with the cooperation of a majority of the network peers in the peer-to-peer network. Accordingly, a blockchain can act as a decentralized secure ledger for recording transactions in a verifiable and permanent manner. In other words, a decentralized secure ledge provides a distributed and immutable record of infrastructure change events that occur with respect to the enterprise. Such a decentralized secure ledger service may be provided by the orchestration system 120 and/or third-party non-governmental service providers that are trusted by the orchestration system 120.

An infrastructure change is a modification to an enterprise infrastructure of an enterprise. Examples of infrastructure changes include a configuration change to the underlying hardware or software architecture of the enterprise infrastructure, a code change to the code that is executing on one or more computing devices of the enterprise infrastructure, an application of a software patch to the software of the enterprise infrastructure, and/or so forth. The infrastructure changes may be performed as remediation responses to identified cybersecurity threats or actual attacks on the enterprise infrastructure. However, in other instances, the infrastructure changes may be performed preemptively even when there are no identified cybersecurity threats or actual attacks.

The infrastructure change events associated with an infrastructure change may include events such as initiation of a proposed infrastructure change, the creation of mirror instance for the testing of the proposed infrastructure change, the application of the proposed infrastructure change to the mirror instance, the execution of a test suite to test the success or failure of the proposed infrastructure change. Once the test suite has been executed, the infrastructure change events may further include a completion of the execution of the test suite, and an administrator decision to implement or not implement the proposed infrastructure change on the enterprise infrastructure. If the administrator decides to implement the proposed infrastructure change, the infrastructure change events may further include an indication of whether the infrastructure change is ultimately deployed or not deployed on the enterprise infrastructure. In some instances, the infrastructure change events may additionally include the rollback of a previously performed infrastructure change or a previously deployed infrastructure change, such as the removal of a software patch, undo of a change to the underlying software or hardware architecture, undo of a code change, etc.

The audit function provided by the reporting tool 324 may trap and/or generate event metadata for each infrastructure change event as the event occur. The event metadata for an infrastructure change event may include a data time stamp for an initiation and/or completion of the infrastructure change event, a user identifier of a user, such as an administrator, that is responsible for the infrastructure change event, a facility identifier of a facility that is affected by the infrastructure change event, an event type identifier for the infrastructure change event, and a unique orchestration system identifier. The data time stamps and identifiers may be assigned by the audit function of the reporting tool 324.

The facility identifier may identify a particular enterprise for which the associated infrastructure change is made. Alternatively, in instances whether an enterprise has multiple locations (e.g., data centers, server farms, etc.), a facility identifier may identify not only the particular enterprise, but also the specific location of the enterprise. The event type identifier identifies the nature of the infrastructure change event. For example, event identifiers may identify events such as a proposed infrastructure change event, the creation of mirror instance for the testing of the proposed infrastructure change event, the application of the proposed infrastructure change to the mirror instance event, the execution of test suite event, a test completion event, an administrator decision event, an infrastructure change deployment event, an infrastructure change rollback event, etc. The audit function of the reporting tool 324 may use a globally unique identifier (GUID) generator to generate a unique orchestration system identifier for each infrastructure change event that occurs.

In some embodiments, the event metadata for each infrastructure change event may include a CVE identification number, a software patch identifier, or another identifier that identifies an attack vector or a specific response to an attack vector. The audit function of the reporting tool 324 may record additional event metadata for some types of infrastructure change events. For example, the event metadata for a test suite execution event may include a test identifier. Likewise, the event metadata for a test completion event may include the test identifier as well as the test result for the test (e.g., success or failure). The event metadata for an administrator decision event may record whether the administrator decided to deploy the infrastructure change. Further, the event metadata for an infrastructure change deployment event that deploys the infrastructure change on the actual enterprise infrastructure may record whether the deployment was successful (e.g., prevented or remediated a threat), or unsuccessful (e.g., failed to prevent or remediate a threat). The audit function may receive such success or failure data from a virus scan software, an intrusion detection software, a vulnerability scan software, or system health monitoring software of the enterprise. In some embodiments, the audit function of the reporting tool 324 may be configured to trap or generate event metadata for at least a basic set of infrastructure change events for every infrastructure change. The basic set of infrastructure change events may include the proposed infrastructure change event, the test result return event, the administrator decision event, and the infrastructure change deployment event. In this way, the recording of event metadata for the basic set of infrastructure change events ensures that a decision to deploy an infrastructure change on an enterprise infrastructure is traceable back to the test result for a simulated deployment of the infrastructure change on a mirror instance. However, the audit function may be configured to trap or generate metadata for other infrastructure change events of an infrastructure change as well in other embodiments.

In other embodiments, the event metadata for an infrastructure change event may include user inputted annotations regarding the infrastructure change event. A user inputted annotation may include a user rating of the significance or importance of the infrastructure change event and/or user notes or commentary regarding the infrastructure change event. For example, the user rating may be selected via a numerical scale that rates the overall impact of the infrastructure change event on the operations of the enterprise infrastructure. In another example, the user commentary regarding an infrastructure change event may be that the event was caused particular error or attack, the event was a false positive, the event was a test, the event was related to another infrastructure change event, and/or so forth. In such embodiments, the audit function may provide a user input interface, e.g., a web portal, a standalone application interface, etc. for a user to input the annotation.

The reporting tool 324 may provide verification reports of infrastructure changes for viewing by the corresponding enterprises, as well as viewing by third parties. For example, an enterprise may wish to view a verification report for an infrastructure change for internal auditing purposes. The third parties who are interested in viewing the verification reports may include government agencies that regulate the enterprises (e.g., the SEC) or insurance carrier that provides insurance coverage to the enterprises. The reporting tool 324 may generate the verification reports from infrastructure change event metadata that are retrieved from the decentralized secure ledger service 134.

In some embodiments, any entity that desires to view the verification reports may establish a user account with the orchestration system 120. The establishment of a user account may include the setup of authentication credentials of the user, identification information of the user, and billing information of the user. The billing information may enable the provider of the decentralized secure ledger service 134 to charge a fee for the provision of the verification reports to each user. For example, the fee may be assessed on a per report basis, per subscription time period basis, per access basis, and/or so forth. A verification report for an infrastructure change that is performed with respect to the enterprise infrastructure of an enterprise may indicate that the infrastructure change is validated as having been performed, or alternatively indicate that infrastructure change cannot be validated as being performed due to a lack of certain infrastructure change events being recorded as having occurred. Since these verification reports are not generated by the enterprises themselves, but are instead generated by the orchestration system 120, the internal audit departments of enterprises, government regulatory agencies, or insurance carriers may trust the veracity of these verification reports.

The orchestration system 120 may provide the decentralized secure ledger service 134 to multiple enterprises. In some embodiments, the decentralized secure ledger service 134 may maintain a single decentralized secure ledge to store event metadata for infrastructure change events of multiple enterprises. However, in other embodiments, the decentralized secure ledger service 134 may maintain a corresponding standalone decentralized secure ledge, i.e., a private blockchain, for each enterprise.

In some embodiments, the reporting tool 324 may perform analysis of the event metadata of infrastructure change events of multiple enterprises as stored in one or more decentralized secure ledgers to detect fault patterns or threat trends. The analysis may also provide information regarding the effectiveness of different remediation measures for a specific problem or threat. In some instances, the event metadata may be anonymized by the reporting tool 324 to remove information that identifies the specific enterprises for the analysis. In other instances, the reporting tool 324 may be configured to analyze data of enterprises that have opted-in for event metadata collection and analysis by the reporting tool 324. The reporting tool 324 may use various techniques, such as decision tree learning, association rule learning, artificial neural networks, inductive logic, Support Vector Machines (SVMs), clustering, Bayesian networks, reinforcement learning, representation learning, similarity and metric learning, etc. to extract the fault patterns, detect threat trends, and/or determine the effectiveness of remediation measures. In this way, the reporting tool 324 may recommend particular remediation measures for resolving specific threats or failures. Accordingly, the reporting tool may generate displays of the via charts, graphs figures, models, schematics, maps, summaries, reports, logs, and/or so forth. Furthermore, the reporting tool 324 may perform the analysis to predict future threats to enterprise infrastructures and/or failures of enterprise infrastructure components. Additional details regarding the operations of the reporting tool 324 in conjunction with the decentralized secure ledger service 134 are further illustrated in FIGS. 10 and 11.

Figure 10:
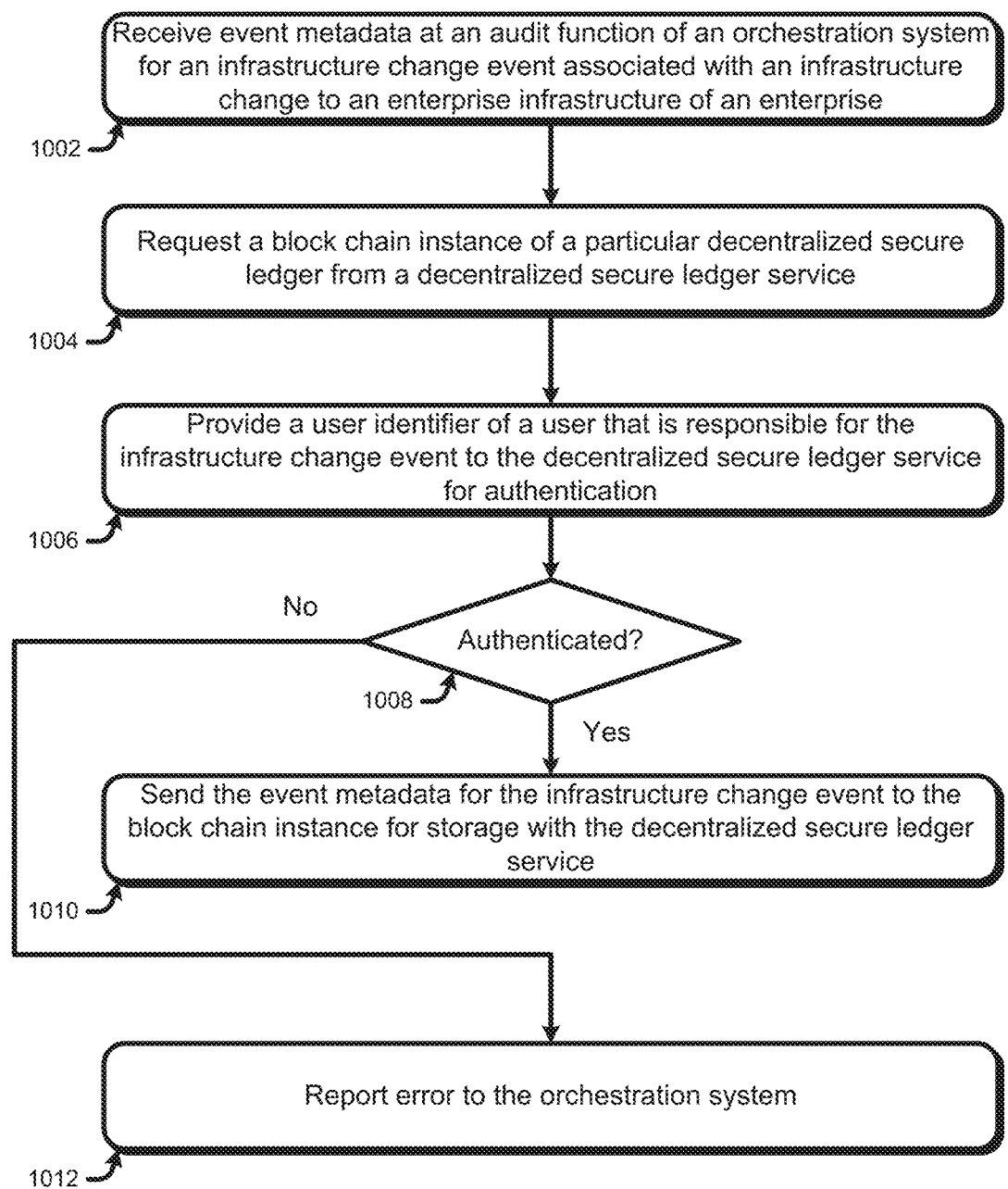
FIG. 10 is a flow chart for distributing event metadata of infrastructure change events for storage in a decentralized secure ledger.

FIG. 10 is a flow chart for distributing event metadata of infrastructure change events for storage in a decentralized secure ledger. In block 1002, the audit function of the orchestration system 120 receives event metadata for an infrastructure change event associated with an infrastructure change to an enterprise infrastructure of an enterprise. In various embodiments, the infrastructure change event may be one of a proposed infrastructure change event, the creation of mirror instance for the testing of the proposed infrastructure change event, the application of the proposed infrastructure change to the mirror instance event, the execution of test suite event, a test completion event, an administrator decision event, an infrastructure change deployment event, etc. In some instances, the infrastructure change event may be the rollback of a previously performed infrastructure change event or a previously deployed infrastructure change, such as the removal of a software patch, undo of a change to the underlying software or hardware architecture, undo of a code change, etc.

In block 1004, the audit function requests a blockchain instance of particular decentralized secure ledger, from a decentralized secure ledger service, such as the decentralized secure ledger service 134. In at least one embodiment, the particular decentralized secure ledger may be a private blockchain that solely stores event metadata for the enterprise. A blockchain instance is a storage node that holds a transaction record. In block 1006, the audit function provides a user authentication credential of a user that is responsible for the infrastructure change event to the decentralized secure ledger service for authentication. The user may be an administrator that is authorized by the orchestration system 120 to perform the infrastructure change for the enterprise. In some embodiments, the audit function may automatically provide the user authentication credential along with the request for the blockchain instance. In other embodiments, the audit function may provide the user authentication credential in response to an authentication prompt from the decentralized secure ledger service, in which the prompt is generated subsequent to the service receiving the request for a blockchain instance.

In decision block 1008, the audit function may determine whether the user authentication credential is authenticated by the decentralized secure ledger service. In various embodiments, the user authentication credential may be authenticated as valid if the user authentication credential belongs to a user that is pre-registered with the decentralized secure ledger service as an authorized user. Accordingly, the decentralized secure ledger service may return a validated user notification to the audit function. Otherwise, the user authentication credential may be rejected by the decentralized secure ledger service as invalid. Accordingly, the decentralized secure ledger service may return an invalid user notification to the audit function. In some instances, the user authentication credential may be a user identifier. In other instances, the user authentication credential may be a combination of a user identifier and a secret, such as a password, a digital certificate, biometric information, and/or so forth.

Thus, the audit function may determine that the user authentication credential is authenticated by the decentralized secure ledger service based on the returned validated user notification. In response, the audit function in block 1010 sends the event metadata for the infrastructure event to the blockchain instance for storage with the decentralized secure ledger service. The audit function may append the user identifier of the user responsible for the infrastructure change event to the event metadata prior to sending the event metadata to the blockchain instance.

In some embodiments, the event metadata may be encrypted via an encryption key that is supplied by the decentralized secure ledger service 134 to the enterprise for sole use with the particular decentralized secure ledger, i.e., private blockchain. The encryption key may be provided by the decentralized secure ledger service 134 to the enterprise for use by the authorized users associated with the enterprise. The encryption key may be downloaded from the decentralized secure ledger service 134 and stored by the enterprise in one or more electronic storage media that are accessible to the audit function. In at least one embodiment, the encryption key may be a public key of a public-private asymmetric cryptographic key pair, in which the private key is held by the decentralized secure ledger service 134. Accordingly, the audit function may encrypt the event metadata using the public key such that the event metadata is decrypted by the decentralized secure ledger service 134 via the private key for storage in the blockchain instance.

Conversely, the audit function may determine that the user authentication credential is rejected by the decentralized secure ledger service based on the returned invalid user notification. In response, the audit function in block 1012 reports the authentication error to an administrator via the dashboard 302. The audit function may also trigger the orchestration system 120 to halt the infrastructure change such that the user authentication error can be resolved.

In rare instances, the decentralized secure ledger service may return an indication that no blockchain instance is available in response to the request from the audit function in block 1004. In such instances, the audit function may halt the steps in blocks 1006-1010 for a predetermined period of time and then retry the request in block 1004. The audit function may perform such retries for a predetermined number of times or until a blockchain instance is located. However, the orchestration system 120 may perform the remaining the infrastructure change events as normal. Meanwhile, the audit function may hold the event metadata for the infrastructure change event in a buffer. Additionally, the audit function may hold the event metadata for any subsequent infrastructure change events that are not stored due to the lack of available blockchain instances in the buffer until those blockchain instances can be located. However, in alternative configurations of the audit function, the audit function may trigger the orchestration system 120 to halt the infrastructure change if the decentralized secure ledger service is unable to provide an available blockchain instance in the predetermined amount of time following a request, or after a predetermined number of retry requests. This may be an indication that the decentralized secure ledger service is no longer operational. Accordingly, the stoppage of the infrastructure change may provide an administrator with an opportunity to command the orchestration system 120 to rollback one or more infrastructure change events that have already occurred so that the infrastructure change events can be re-executed once the decentralized secure ledger service is operational (e.g., the service is able to provide available blockchain instances).

Figure 11:
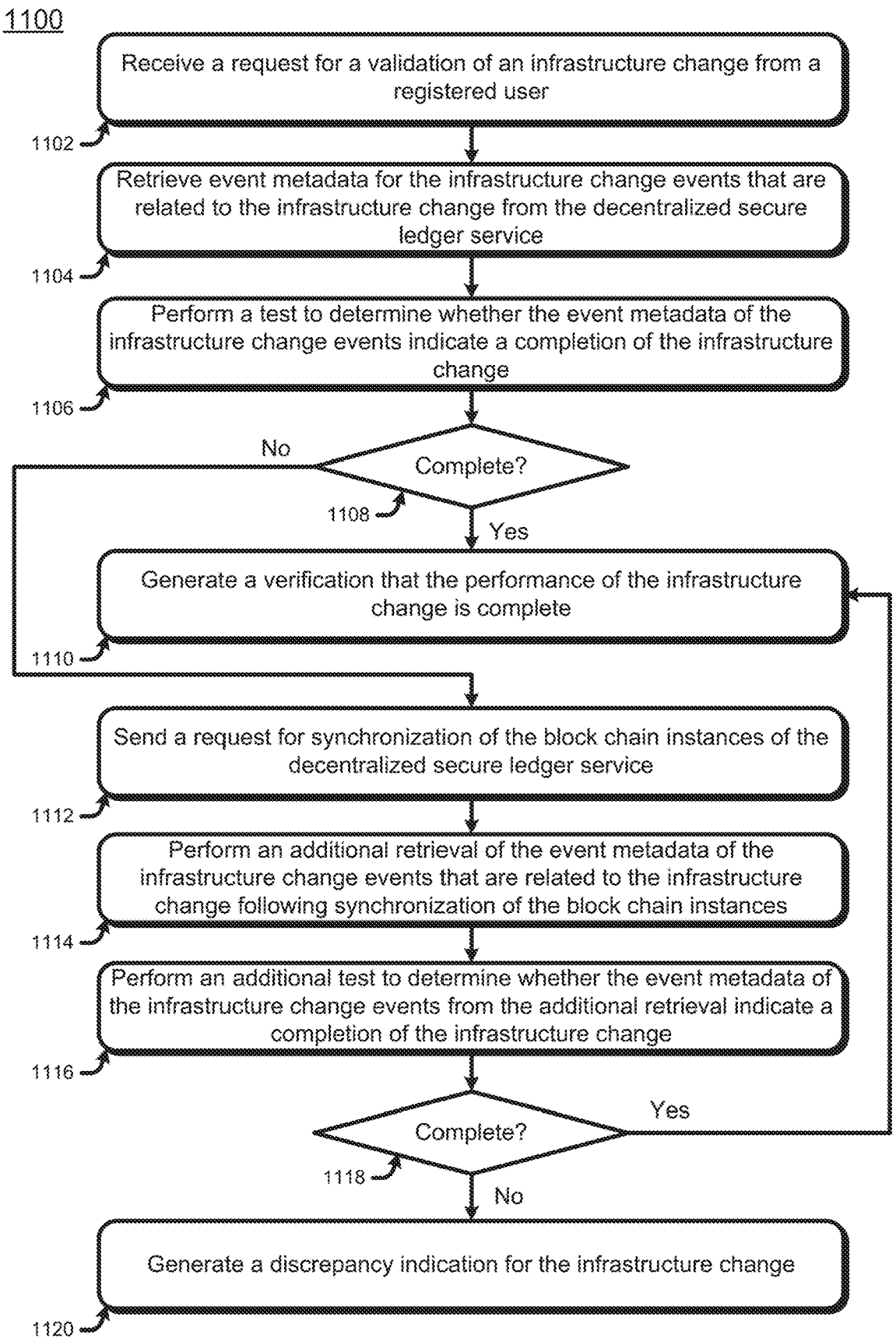
FIG. 11 is a flow chart for generating a report for validating the deployment of an infrastructure change on an enterprise infrastructure of an enterprise.

FIG. 11 is a flow chart for generating a report for validating the deployment of an infrastructure change on an enterprise infrastructure of an enterprise. In block 1102, the audit function of the reporting tool 324 may receive a request for a validation of an infrastructure change from a registered user. For example, the request may include a query for all infrastructure change events with event metadata that indicate the events occurred in a particular time period, and optionally have a specific facility identifier. In another example, the request may include a query for all infrastructure change events with event metadata that indicate the events are associated with a specific CVE identification number or a specific software patch identifier, and occurring in a particular time period. In an additional example, the request may include a query for all infrastructure change events with event metadata that indicate the events are associated with a particular facility identifier as well as a specific CVE identification number or a specific software patch identifier, and occurring in a particular time period.

In block 1104, the audit function may retrieve requested event metadata for the infrastructure change events that are related to the infrastructure change from a decentralized secure ledger service, such as the decentralized secure ledger service 134. For example, the decentralized secure ledger service may retrieve event metadata for all infrastructure change events that match a particular query. In return, the decentralized secure ledger service may retrieve from the corresponding chain block instances the event metadata of the infrastructure events that matched the particular query for delivery to the audit function. In block 1106, the audit function may perform a test to determine whether the event metadata of infrastructure change events indicate a completion of the infrastructure change. In some embodiments, the test may require that the infrastructure change events for an infrastructure change include at a minimum (1) a propose infrastructure change event, (2) the test result return event, (3) the administrator decision event, and (4) the infrastructure change deployment event.

Further, in order for the test to determine that the infrastructure change is complete, the test should observe that the event metadata for the test result return event contains a successful test indication, the event metadata for the administrator decision event contains an indication of a decision to deploy the infrastructure change, and the event metadata for the infrastructure change deployment event contains an indication that the infrastructure change was deployed. In other embodiments, the test may require other additional infrastructure change events to be present in order to deem the infrastructure change to be complete. In decision block 1108, if the test performed by the audit function indicates that the infrastructure change is complete, the audit function in block 1110 generates a verification that the performance of the infrastructure change is complete. The verification is sent for presentation to the registered user. For example, the audit function may generate an electronic report that is delivered via email or a reporting dashboard to the registered user.

However, if the test performed by the audit function in decision block 1108 indicates that the infrastructure change is incomplete, the audit function in block 1112 sends a request to the decentralized secure ledger service for synchronization of the blockchain instances of the service. In turn, the decentralized secure ledger service may initiate synchronization of the blockchain instances. In block 1114, the audit function may perform an additional retrieval of the event metadata of the infrastructure change events that are related to the infrastructure change following synchronization of the blockchain instances. In some embodiments, the additional retrieval may be performed following an indication from the decentralized secure ledger service that the synchronization is complete. In other embodiments, the additional retrieval may be performed after a predetermined time period has passed. The additional retrieval may involve a re-execution of the same query for event metadata in block 1104.

In block 1116, the audit function may perform an additional test to determine whether the event metadata of the infrastructure change events from the additional retrieval indicates a completion of the infrastructure change. In decision block 1108, if the test performed by the audit function indicates that the infrastructure change is complete, the audit function may return to block 1110 to generates an indication that the performance of the infrastructure change is complete. However, if the test performed by the audit function in decision block 1118 indicates that the infrastructure change is incomplete, the audit function in 1120 may generate a discrepancy indication for the infrastructure change. The discrepancy indication shows that the infrastructure change is incomplete, possibly due to a system malfunction or human error. The indication is sent for presentation to the registered user. For example, the audit function may generate an electronic report that is delivered via email or a reporting dashboard to the registered user.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. One or more computer storage media storing computer-executable instructions that upon execution cause one or more processors to perform acts comprising:
   receiving event metadata at an audit function for an infrastructure change event associated with an infrastructure change to an enterprise infrastructure of an enterprise;
   requesting a blockchain instance of a particular decentralized secure ledger from a decentralized secure ledger service via the audit function;
   providing, via the audit function, a user identifier of a user that is responsible for the infrastructure change event to the decentralized secure ledger service; and
   sending, via the audit function, the event metadata for the infrastructure change event to the blockchain instance for storage with the decentralized secure ledger service in response to the decentralized secure ledger service authenticating the user identifier.

2. The one or more computer storage media of claim 1, wherein the infrastructure change event is a proposed infrastructure change or a creation of a mirror instance for testing of the proposed infrastructure change.

3. The one or more computer storage media of claim 1, wherein the infrastructure change event is an application of a proposed infrastructure change to a mirror instance, an execution of a test suite for the proposed infrastructure change, a test completion for the proposed infrastructure change, an administrator decision for proceeding with the proposed infrastructure change, or a deployment of the proposed infrastructure change to the enterprise infrastructure.

4. The one or more computer storage media of claim 1, wherein the infrastructure change event is a rollback of a previously performed infrastructure change or a rollback of a previously deployed infrastructure change.

5. The one or more computer storage media of claim 4, wherein the rollback of the previously deployed infrastructure change includes removal of a software patch to the enterprise infrastructure, undo of a change to underlying software of the enterprise infrastructure, or undo of a code change to the enterprise infrastructure.

6. The one or more computer storage media of claim 1, wherein the acts further comprise at least one of:
   analyzing multiple event metadata for a plurality of infrastructure change events of multiple enterprises as stored in one or more decentralized secure ledgers to detect a fault pattern or a threat trend; and
   providing information regarding effectiveness of one or more remediation measures for the fault pattern or the threat trend.

7. The one or more computer storage media of claim 1, wherein the audit function is configured to append at least one the user identifier of the user or a user annotation regarding a corresponding infrastructure change event to the event metadata prior to sending the event metadata for the infrastructure change event to the blockchain instance.

8. The one or more computer storage media of claim 1, wherein the event metadata is encrypted by the audit function via a public key of a private-public asymmetric key pair supplied by the decentralized secure ledge service, and wherein the event metadata is decrypted by the decentralized secure ledger service via a private key of the private-public asymmetric key pair for storage in the blockchain instance.

9. The one or more computer storage media of claim 1, wherein the acts further comprise triggering, via the audit function, a halt of the infrastructure change in response to a determination that the decentralized secure ledger service is unable to provide an available blockchain instance in a predetermined amount of time following a request or after a predetermined number of retry requests.

10. The one or more computer storage media of claim 9, wherein the acts further comprise:
    triggering, via the audit function, a rollback of at least one infrastructure change event that has already occurred; and
    receiving, via the audit function, event metadata for the at least one infrastructure change event that are re-executed following the decentralized secure ledger service being once again able to provide one or more available bock chain instances.

11. The one or more computer storage media of claim 1, wherein the acts further comprise:
    receiving, at the audit function, a request for a validation of the infrastructure change from the user;
    retrieving, via the audit function, event metadata for one or more infrastructure change events that are related to the infrastructure change from the decentralized secure ledger service;
    determining, at the audit function, whether the event metadata of the one or more infrastructure change events indicate a completion of the infrastructure change; and generating, at the audit function, a verification that a performance of the infrastructure change is complete in response to a determination that the event metadata indicate the completion of the infrastructure change.

12. The one or more computer storage media of claim 11, wherein the acts further comprise, in response to a determination that the event metadata indicate the infrastructure change is incomplete:
sending, via the audit function, a request for synchronization of blockchain instances of the decentralized secure ledger service;
performing, via the audit function, an additional retrieval of event metadata of the one or more infrastructure change events that are related to the infrastructure change following the synchronization of the blockchain instances;
performing, via the audit function, an additional determination of whether the event metadata of the one or more infrastructure change events retrieved via the additional retrieval indicate the completion of the infrastructure change; and
generating, at the audit function, a discrepancy indication that the performance of the infrastructure change is incomplete in response to the additional determination showing that the event metadata of the additional retrieval indicate an incompletion of the infrastructure change.

13. The one or more computer storage media of claim 12, wherein the acts further comprise generating the verification that the performance of the infrastructure change is complete in response to the additional determination showing that the event metadata of the additional retrieval indicate a completion of the infrastructure change.

14. The one or more computer storage media of claim 1, wherein the decentralized secure ledger service provides a single authoritative source of vulnerability and remediation data for the enterprise that includes a distributed and immutable record of infrastructure change events that occur with respect to the enterprise.

15. A system, comprising:
one or more processors; and
computer storage media having instructions stored therein, the instructions, when executed by the one or more processors, cause the one or more processors to perform acts comprising:
receiving a request for a validation of an infrastructure change from a user;
retrieving event metadata for one or more infrastructure change events that are related to the infrastructure change from a decentralized secure ledger service;
determining whether the event metadata of the one or more infrastructure change events indicate a completion of the infrastructure change; and
generating a verification that a performance of the infrastructure change is complete in response to a determination that the event metadata indicate the completion of the infrastructure change.

16. The system of claim 15, wherein the acts further comprise, in response to a determination that the event metadata indicate the infrastructure change is incomplete:
sending a request for synchronization of blockchain instances of the decentralized secure ledger service; and
performing an additional retrieval of the event metadata for the infrastructure change events that are related to the infrastructure change from the decentralized secure ledger service following the synchronization of the blockchain instances.

17. The system of claim 16, wherein the acts further comprise generating an indication that the infrastructure change is incomplete in response to a determination that the event metadata retrieved via the additional retrieval indicate the infrastructure change is not complete.

18. The system of claim 15, wherein the acts further comprise, in response to a determination that the event metadata indicate the infrastructure change is incomplete, performing an additional retrieval of the event metadata for the infrastructure change events that are related to the infrastructure change from the decentralized secure ledger service following a predetermined amount of time.

19. The system of claim 15, wherein the event metadata is determined to indicate a completion of the infrastructure change when (1) test result metadata in the event metadata contains an indication of a successful test of the infrastructure change; (2) administrator decision metadata in the event metadata contain an indication of a decision to deploy the infrastructure change; and (3) deployment metadata in the event metadata contain an indication that the infrastructure change was deployed.

20. A computer-implemented method, comprising:
receiving event metadata at an audit function of an orchestration system for an infrastructure change event associated with an infrastructure change to an enterprise infrastructure of an enterprise;
requesting a blockchain instance of a particular decentralized secure ledger from a decentralized secure ledger service that is maintained solely for the enterprise via the audit function;
providing, via the audit function, a user identifier of a user that is responsible for the infrastructure change event to the decentralized secure ledger service; and
sending, via the audit function, the event metadata for the infrastructure change event to the blockchain instance for storage with the decentralized secure ledger service in response to the decentralized secure ledger service authenticating the user identifier.

21. The computer-implemented method of claim 20, further comprising:
receiving, at the audit function, a request for a validation of the infrastructure change from the user;
retrieving, via the audit function, event metadata for one or more infrastructure change events that are related to the infrastructure change from the decentralized secure ledger service;
determining, at the audit function, whether the event metadata of the one or more infrastructure change events indicate a completion of the infrastructure change; and
generating, at the audit function, a verification that a performance of the infrastructure change is complete in response to a determination that the event metadata indicate the completion of the infrastructure change.

22. The computer-implemented method of claim 21, further comprise, in response to a determination that the event metadata indicate the infrastructure change is incomplete:
sending, via an audit function, a request for synchronization of blockchain instances of the decentralized secure ledger service;
performing, via the audit function, an additional retrieval of event metadata of the one or more infrastructure change events that are related to the infrastructure change following the synchronization of the blockchain instances;

performing, at the audit function, an additional determination of whether the event metadata of the one or more infrastructure change events retrieved via the additional retrieval indicate completion of the infrastructure change; and generating, at the audit function, a discrepancy indication that the performance of the infrastructure change is incomplete in response to the additional determination showing that the event metadata of the additional retrieval indicate an incompletion of the infrastructure change.

\* \* \* \* \*